United States Patent
Sengupta et al.

(10) Patent No.: US 12,307,735 B2
(45) Date of Patent: May 20, 2025

(54) REMOVING ARTIFACTS IN IMAGES CAUSED BY LIGHT EMITTED BY ELECTRONIC SCREENS

(71) Applicant: Microsoft Technology Licensing, LLC, Redmond, WA (US)

(72) Inventors: Sunando Sengupta, Reading (GB); Ebey Paulose Abraham, Oxford (GB); Alexandros Neofytou, London (GB); Eric Chris Wolfgang Sommerlade, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 17/899,325

(22) Filed: Aug. 30, 2022

(65) Prior Publication Data

US 2024/0071042 A1 Feb. 29, 2024

(51) Int. Cl.
*G06V 10/60* (2022.01)
*G06T 5/50* (2006.01)
(Continued)

(52) U.S. Cl.
CPC ............... *G06V 10/60* (2022.01); *G06T 5/50* (2013.01); *G06V 10/141* (2022.01); *G06V 10/25* (2022.01);
(Continued)

(58) Field of Classification Search
CPC ............. G06T 5/50; G06T 2207/10016; G06T 2207/10024; G06T 2207/10152;
(Continued)

(56) References Cited

U.S. PATENT DOCUMENTS

| | | | |
|---|---|---|---|
| 2020/0186727 A1* | 6/2020 | Denoue | G06V 40/20 |
| 2022/0262326 A1 | 8/2022 | Sommerlade et al. | |
| 2023/0334631 A1* | 10/2023 | Campbell | G06N 3/084 |

FOREIGN PATENT DOCUMENTS

WO 2022060348 A1 3/2022

OTHER PUBLICATIONS

Alexander, et al. "Digital Ira: Creating a Real-Time Photoreal Digital Actor," in SIGGRAPH '13: ACM SIGGRAPH 2013, Jul. 2013, 1 page.

(Continued)

*Primary Examiner* — Huy C Ho

(57) ABSTRACT

An image-processing technique is described herein for removing a visual effect in a face region of an image caused, at least in part, by screen illumination provided by an electronic screen. The technique can perform this removal without advance knowledge of the nature of the screen illumination provided by the electronic screen. The technique improves the quality of the image and also protects the privacy of a user by removing the visual effect in the face region that may reveal the characteristics of display information presented on the electronic screen. In some implementations, the technique first adjusts a face region of the image, and then adjusts other regions in the image for consistency with the face region. In some implementations, the technique is applied by a videoconferencing application, and is performed by a local computing device.

20 Claims, 10 Drawing Sheets

(51) Int. Cl.
  *G06V 10/141* (2022.01)
  *G06V 10/25* (2022.01)
  *G06V 10/77* (2022.01)
  *G06V 40/16* (2022.01)
  *H04N 7/15* (2006.01)

(52) U.S. Cl.
  CPC ........ *G06V 10/7715* (2022.01); *G06V 40/169* (2022.01); *H04N 7/15* (2013.01); *G06T 2207/10016* (2013.01); *G06T 2207/10024* (2013.01); *G06T 2207/10152* (2013.01); *G06T 2207/20081* (2013.01); *G06T 2207/20221* (2013.01)

(58) Field of Classification Search
  CPC . G06T 2207/20081; G06T 2207/20221; G06T 5/94; G06T 2207/20084; G06T 2207/30201; G06V 10/141; G06V 10/25; G06V 10/7715; G06V 40/169; H04N 7/15; H04N 7/147
  USPC .......................................................... 382/274
  See application file for complete search history.

(56) References Cited

OTHER PUBLICATIONS

Alexander, et al., "Creating a Photoreal Digital Actor: The Digital Emily Project," in SIGGRAPH '09: ACM SIGGRAPH 2009, Article No. 12, 2009, 15 pages.

Backes, et al., "Tempest in a Teapot: Compromising Reflections Revisited," in 2009 30th IEEE Symposium on Security and Privacy, 2009, pp. 315-327.

Calian, et al., "From Faces to Outdoor Light Probe," in Computer Graphics Forum, Eurographics EUROGRAPHICS 2018, vol. 37, No. 2, 2018, 11 pages.

Debevec, et al., "Acquiring the Reflectance Field of a Human Face," in SIGGRAPH '00: Proceedings of the 27th Annual Conference on Computer Graphics and Interactive Techniques, Jul. 2000, pp. 145-156.

Ding, et al., "Image Quality Assessment: Unifying Structure and Texture Similarity," in IEEE Transactions on Pattern Analysis and Machine Intelligence, vol. 44, No. 5, May 2022, pp. 2567-2581.

Farrukh, et al., "FaceRevelio: A Face Liveness Detection System for Smartphones with a Single Front Camera," in MobiCom '20: Proceedings of the 26th Annual International Conference on Mobile Computing and Networking, Article No. 49, Sep. 2020, 13 pages.

Gulrajani, et al. "Improved Training of Wasserstein GANs," in Advances in Neural Information Processing Systems 30 (NIPS 2017), 2017, 11 pages.

"Parameter values for the HDTV standards for production and international programme exchange," in International Telecommunications Union, Rec. ITU-R BT.709-6, Jun. 2015, 19 pages.

Legendre, et al., "Learning Illumination from Diverse Portraits," in SA '20: SIGGRAPH Asia 2020 Technical Communications, Article No. 7, Dec. 2020, 4 pages.

Liu, et al., "Poster: Video Chat Scam Detection Leveraging Screen Light Reflection," in MobiCom '19: The 25th Annual International Conference on Mobile Computing and Networking, Article No. 92, Oct. 2019, 3 pages.

Luan, et al., "Deep Photo Style Transfer," open access version of paper in 2017 IEEE Conference on Computer Vision and Pattern Recognition (CVPR), 2017, 9 pages.

Newell, "Stacked Hourglass Networks for Human Pose Estimation," in Leibe, et al. (eds), Computer Vision—ECCV 2016. ECCV 2016, Lecture Notes in Computer Science, Springer, vol. 9912, 2016, pp. 483-499.

Pandey, et al., "Total Relighting: Learning to Relight Portraits for Background Replacement," in ACM Transactions on Graphics, vol. 40, Issue 4, Article No. 43, Aug. 2021, 21 pages.

Parkhi, et al., "Deep Face Recognition," in British Machine Vision Conference, in Proceedings of the British Machine Vision Conference (BMVC), Xie, et al. (editors), Sep. 2015, 12 pages.

Peers, et al., "Post-production Facial Performance Relighting using Reflectance Transfer," in ACM Transactions on Graphics, vol. 26, Issue 3, Article 52, Jul. 2007, 10 pages.

Ronneberger, "U-Net: Convolutional Networks for Biomedical Image Segmentation," in Cornel University arXiv library, arXiv:1505.04597v1 [cs.CV], May 18, 2015, 8 pages.

Sengupta, "A Light Stage on Every Desk," open access version of paper in 2021 IEEE/CVF International Conference on Computer Vision (ICCV), Oct. 2021, 10 pages.

Shih, et al., "Style Transfer for Headshot Portraits," in ACM Transactions on Graphics, vol. 33, No. 4, Article No. 148, Jul. 2014, 14 pages.

Shu, et al., "Portrait Lighting Transfer Using a Mass Transport Approach," in ACM Transactions on Graphics, vol. 27, Issue 1, Article No. 2, 2017, 15 pages.

Smith, et al., "Face Recognition on Consumer Devices: Reflections on Replay Attacks," in IEEE Transactions on Information Forensics and Security, vol. 10, No. 4, Apr. 2015, pp. 736-745.

Ng, et al., "A Multi-Layered Reflection Model of Natural Human Skin," in Proceedings of the Computer Graphics International 2001, 2001, pp. 249-256.

Sun, et al., "Single Image Portrait Relighting," in ACM Transactions on Graphics, vol. 38, Issue 4, Article No. 79, Jul. 2019, 12 pages.

Sun, et al., "Light Stage Super-Resolution: Continuous High-Frequency Relighting," in ACM Transactions on Graphics, vol. 39, Issue 6, Dec. 2020 Article No. 26, 12 pages.

Wang, et al., "Deep Relighting Networks for Image Light Source Manipulation," in Bartoli, et al. (ed), Computer Vision—ECCV 2020 Workshops, Lecture Notes in Computer Science, Springer, vol. 12537, Aug. 2020, pp. 550-567.

Wang, et al., "Single Image Portrait Relighting via Explicit Multiple Reflectance Channel Modeling," in ACM Transactions on Graphics, ACM Transactions on Graphics, vol. 39, Issue 6, Article No. 220, Dec. 2020, 13 pages.

Yi, et al., "Faces as Lighting Probes via Unsupervised Deep Highlight Extraction," open access version of paper in Proceedings of the European Conference on Computer Vision (ECCV), 2018, 17 pages.

Zhang, et al., "The Unreasonable Effectiveness of Deep Features as a Perceptual Metric," open access version of paper in CVPR 2018, 2018 Conference on Computer Vision and Pattern Recognition, Jun. 2018, 10 pages.

Zhang, et al., "PR-RL: Portrait Relighting Via Deep Reinforcement Learning," in IEEE Transactions on Multimedia, vol. 24, Jul. 2021, pp. 3240-3255.

Zhou, et al., "Deep Single-Image Portrait Relighting," open access version of paper in 2019 IEEE/CVF International Conference on Computer Vision (ICCV), 2019, 9 pages.

Zhou, et al., Deep Single-Image Portrait Relighting, Supplementary Material, available at https://zhhoper.github.io/dpr.html, accompanying supplemental material to paper submitted in 2019 IEEE/CVF International Conference on Computer Vision (ICCV), Github, 2019, 11 pages.

He, et al., "Deep Residual Learning for Image Recognition," Cornell University arXiv library, arXiv: 1512.03385v1 [cs.CV], Dec. 10, 2015, 10 pages.

Vaswani, et al., "Attention Is All You Need," Cornell University arXiv library, arXiv:1706.03762v5 [cs.CL], Dec. 6, 2017, 15 pages.

Kuo, et a l., "Multiple Object Tracking: A Literature Review," Cornell University arXiv library, arXiv:1409.7618v5 [cs. CV], Feb. 11, 2022, 49 pages.

Ren, et al., "Faster R-CNN: Towards Real-Time Object Detection with Region Proposal Networks," Cornell University arXiv library, arXiv:1506.01497v3 [cs.CV], Jan. 6, 2016, 14 pages.

Liu, et al., "SSD: Single Shot MultiBox Detector," Cornell University arXiv library, arXiv:1512.02325v5 [cs.CV], Dec. 29, 2016, 17 pages.

(56) References Cited

OTHER PUBLICATIONS

Redmon, et al., "You Only Look Once: Unified, Real-Time Object Detection," Cornell University arXiv library, available at arXiv:1506.02640v5 [cs.CV], May 9, 2016, 10 pages.

Ciaparrone, e al., "Deep Learning in Video Multi-Object Tracking: A Survey," Cornell University arXiv library, arXiv: 1907.12740v4 [cs.CV], Nov. 19, 2019, 42 pages.

PCT Search Report and Written Opinion for PCT/US2023/027215, mailing date Oct. 9, 2023 (received by undersigned on Oct. 6, 2023), 16 pages.

O'Byrne, et al., "Semantic Segmentation of Underwater Imagery Using Deep Networks Trained on Synthetic Imagery," in Journal of Marine Science and Engineering, vol. 6, 93, Aug. 2018, 15 pages.

\* cited by examiner

OVERVIEW OF OPERATION OF THE TRANSFORMING COMPONENT 902

RECEIVE AN INPUT IMAGE CAPTURED BY A CAMERA UNDER SOURCE CONDITIONS, THE INPUT IMAGE SHOWING A USER.
904

REMOVE, USING A MACHINE-TRAINED MODEL, A VISUAL EFFECT FROM A SOURCE REGION OF INTEREST OF THE INPUT IMAGE THAT IS CAUSED BY THE SOURCE CONDITIONS, THE REMOVING BEING PERFORMED BY USING THE MACHINE-TRAINED MODEL TO TRANSFORM THE SOURCE REGION OF INTEREST TO A TARGET REGION OF INTEREST FOR A SIMULATED CASE IN WHICH THE INPUT IMAGE IS CONSIDERED TO HAVE BEEN CAPTURED UNDER TARGET CONDITIONS THAT ARE DIFFERENT THAN THE SOURCE CONDITIONS, THE SOURCE CONDITIONS INCLUDING FIRST SCREEN ILLUMINATION THAT IS ACTUALLY PRESENTED BY AN ELECTRONIC SCREEN WITH WHICH THE USER IS INTERACTING, AND THE TARGET CONDITIONS INCLUDING SECOND SCREEN ILLUMINATION THAT IS PRESENTED BY THE ELECTRONIC SCREEN FOR THE SIMULATED CASE, THE SECOND SCREEN ILLUMINATION BEING DIFFERENT THAN THE FIRST SCREEN ILLUMINATION.
906

PRODUCE AN OUTPUT IMAGE BASED ON THE TARGET REGION OF INTEREST.
908

FIG. 9

OVERVIEW OF OPERATION OF THE TRANSFORMING COMPONENT 1002

RECEIVE AN INPUT IMAGE THAT INCLUDES A FACE REGION THAT REPRESENTS A FACE OF A USER WHO IS INTERACTING WITH DISPLAY INFORMATION PRESENTED ON AN ELECTRONIC SCREEN.
1004

REMOVE A VISUAL EFFECT FROM THE FACE REGION OF THE INPUT IMAGE THAT IS CAUSED, AT LEAST IN PART, BY SCREEN ILLUMINATION PROVIDED BY THE ELECTRONIC SCREEN, TO PROVIDE A PROCESSED IMAGE.
1006

PRODUCE AN OUTPUT IMAGE BASED ON THE PROCESSED IMAGE, THE REMOVING USING A MACHINE-TRAINED MODEL TO GENERATE THE PROCESSED IMAGE BASED ON THE INPUT IMAGE, INDEPENDENT OF AN INPUT SIGNAL THAT DESCRIBES THE SCREEN ILLUMINATION PROVIDED BY THE ELECTRONIC SCREEN.
1008

FIG. 10

OVERVIEW OF OPERATION OF THE EXAMPLE-MINING SYSTEM
AND TRAINING SYSTEM 1202

GENERATE AN EXAMPLE IMAGE THAT SHOWS A VIRTUAL ENVIRONMENT, THE VIRTUAL ENVIRONMENT INCLUDING A SIMULATED USER FACE ILLUMINATED BY PLURAL SOURCES OF SIMULATED ILLUMINATION, ONE OF THE SOURCES BEING A SIMULATED ELECTRONIC SCREEN.
1204

PRODUCE A PARTICULAR TRAINING EXAMPLE THAT INCLUDES THE EXAMPLE IMAGE, A DESCRIPTION OF SIMULATED DISPLAY INFORMATION PRESENTED BY THE SIMULATED ELECTRONIC SCREEN, AND A GROUND-TRUTH IMAGE THAT SHOWS THE SIMULATED USER FACE FREE OF ARTIFACTS CAUSED BY SIMULATED LIGHT PROJECTED BY THE SIMULATED ELECTRONIC SCREEN.
1206

TRAIN THE MACHINE-TRAINED MODEL BASED ON A SET OF TRAINING EXAMPLES THAT INCLUDES THE PARTICULAR TRAINING EXAMPLE, OTHER TRAINING EXAMPLES IN THE SET BESIDES THE PARTICULAR TRAINING EXAMPLE BEING CREATED IN A SAME WAY AS THE TARGET TRAINING EXAMPLE.
1208

FIG. 12

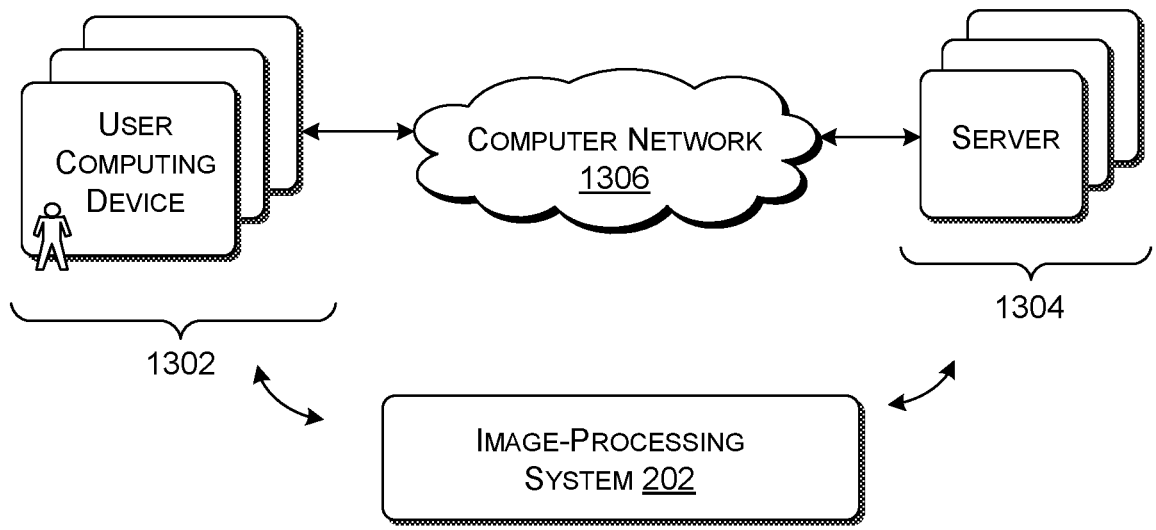

FIG. 13

REMOVING ARTIFACTS IN IMAGES CAUSED BY LIGHT EMITTED BY ELECTRONIC SCREENS

BACKGROUND

Information displayed on an electronic screen causes reflections on a face of a user who is interacting with the electronic screen. The reflections may contain clues regarding the content presented by the electronic screen. An image or video captured of the user's face can therefore potentially compromise the privacy of the user. This problem may affect videoconferencing sessions, particularly in those situations in which a user does not have adequate lighting. In this situation, the illumination of the user's screen on his or her face is particularly pronounced. Many techniques exist in the technical literature for improving the quality of images and videos. However, these techniques do not remove reflections caused by an electronic screen without further compromising the privacy of the user.

SUMMARY

An image-processing technique is described herein for removing a visual effect in at least a face region of an input image caused, at least in part, by screen illumination provided by an electronic screen, to provide a processed image. The screen illumination, in turn, is caused by display information presented by the electronic screen and/or characteristics of the electronic screen other than the content it presents. The technique can perform this removal without advance knowledge of the nature of the screen illumination provided by the electronic screen. The technique protects the privacy of a user in at least two ways: by removing the visual effect in the face region that reveals the characteristics of the display information presented on the electronic screen; and by omitting the need to provide information that describes the screen illumination. The technique also improves the quality of the input image. For instance, the technique lightens at least the face region of the image in those situations in which the user's environment does not provide adequate lighting.

More generally stated, the technique receives an input image captured by a camera under source conditions. The technique removes a visual effect from the input image that is caused by the source conditions. The screen illumination is just one factor that contributes to the source conditions. Further, the technique can be applied to remove visual effects from any region(s) of the input image, not limited to the face region.

In some implementations, the image is taken from a frame of input video. In some implementations, the input video captures the face of a user who is taking part in a videoconferencing session. A videoconferencing application leverages the technique to remove the visual effect caused by the screen illumination (and/or other source(s)), prior to sending the input video to videoconferencing participants. The technique also helps ensure that all participants of the videoconferencing session are illuminated in a consistent manner, despite the existence of poor lighting conditions and/or other anomalies in the local environment of any participant.

In some implementations, the technique is performed locally by a computing device that implements a videoconferencing application.

In some implementations, the technique changes the appearance of one or more other regions of the input image besides the face region, with the objective of making the appearance of those region(s) consistent with the appearance of the face region in the processed image. For instance, the technique changes the intensity and/or coloring of a torso region of the input image so that it is consistent with the intensity and/or coloring of the face region in the processed image. This aspect further improves the quality of the processed image.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 9 shows a process that explains one manner of operation of the effect-removing component of FIG. 2.

FIG. 10 shows a process that explains another manner of operation of the effect-removing component of FIG. 2.

FIG. 12 show a process that explains one manner of operation of the example-mining system and the training system of FIG. 2.

FIG. 13 shows example computing equipment that, in some implementations, is used to implement the image-processing system shown in FIG. 2.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative image-processing system for removing a visual effect in an image or video caused, at least in part, by screen illumination produced by an electronic screen without compromising the privacy of the user. Section B sets forth illustrative methods that explain the operation of the image-processing system of Section A. Section C describes illustrative computing functionality that, in some implementations, is used to implement any aspect of the features described in Sections A and B.

A. Illustrative Image-Processing System

Figure 1:
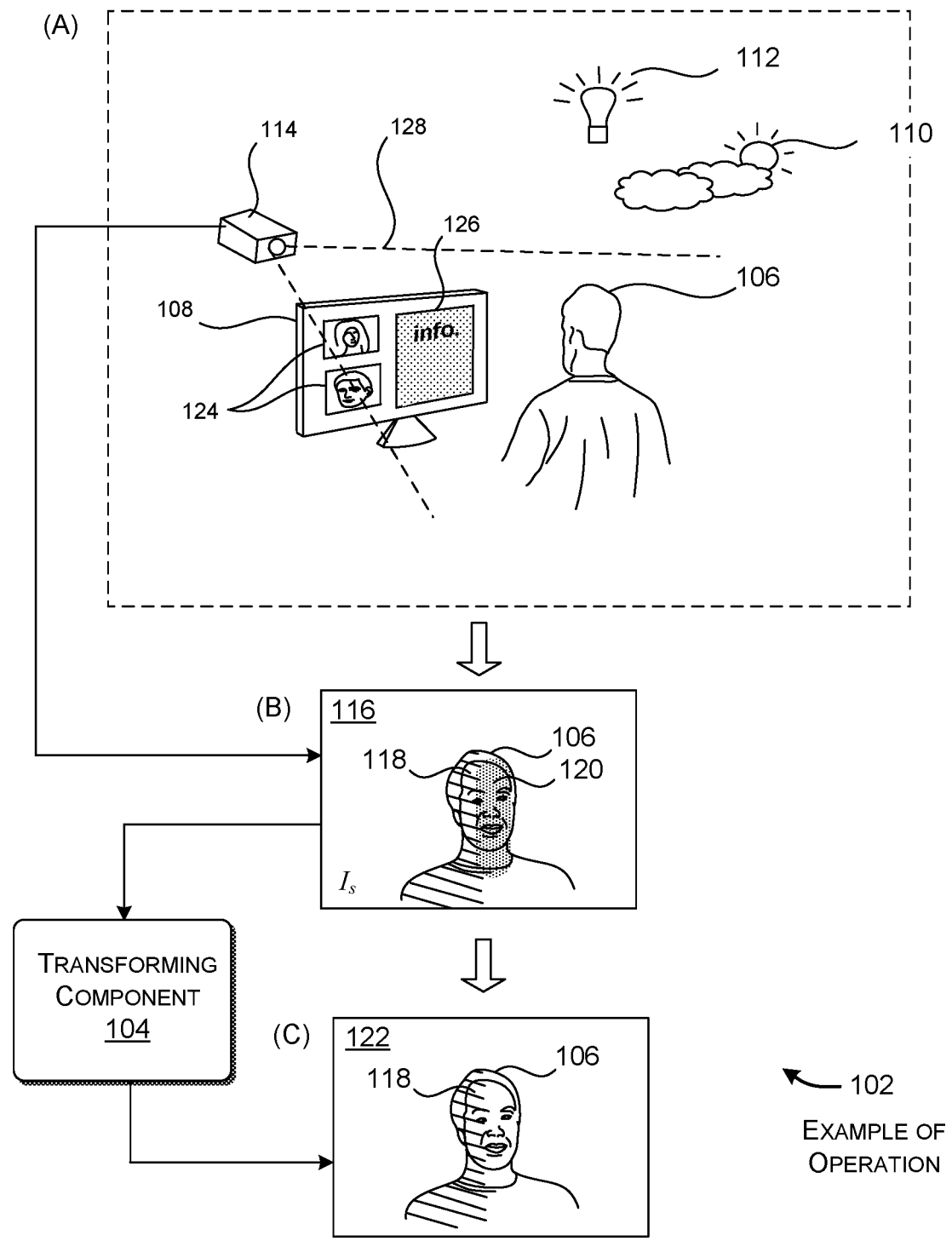
FIG. 1 shows an example of the operation of an image-processing system.

FIG. 1 shows an example 102 of the operation of a transforming component 104 of an image-processing system (not shown in FIG. 1). In this scenario, a user 106 interacts with display information of any type(s) presented on an electronic screen 108. The face of the user is illuminated by one or more sources of illumination, such as a natural light source 110 (e.g., sunlight entering the user's environment via a window), an artificial light source 112 (e.g., a lamp within the user's environment), and the electronic screen 108 itself. More specifically, with respect to the last-mentioned source, screen illumination provided by the electronic screen 108 that strikes the user's face causes a change to the appearance of the user's face. The screen illumination, in turn, is a function of the content (display information) that the electronic screen 108 presents and/or any other characteristic(s) of the electronic screen 108 that contribute to the light it produces (including screen settings, physical characteristics of the electronic screen 108 itself, and so on).

A camera 114 captures images of at least the face of the user 106 as he interacts with the information presented by the electronic screen 108. These images also capture the visual effects caused by all of the light sources in the user's environment, including the visual effect caused by light emitted by the electronic screen 108. The transforming component 104 selectively removes the visual effect caused by at least the electronic screen 108 with the illustrative objectives of: ensuring the secrecy of the display information presented on the electronic screen 108; protecting the privacy of the user 106 who interacts with the electronic screen 108; and improving the quality of the images captured by the camera 114. As used herein, a visual effect refers to any change to an image or video that manifests itself in the visible spectrum that is caused by a particular light source and/or any other source that affects the quality of the images captured by the camera 114. Often, a visible effect caused by the electronic screen 108 includes a change in color, intensity, clarity (e.g., degree of distortion), etc. Often, a visible effect caused by the electronic screen 108 manifests itself as an unwanted artifact.

More specifically the top panel (A) of FIG. 1 shows the user 106 facing the electronic screen 108 and the camera 114. The middle panel (B) of FIG. 1 shows an input image ($I_s$) 116 that includes the user's face captured by the camera 114. The input image 116 exhibits visual effects caused by all of the light sources in the room and/or other factors. For example, the visual effects include a shadow 118 caused by the artificial light source 112. The visual effects also include a tint 120 caused by at least one of the predominant colors of content presented by the electronic screen 108. The bottom panel (C) of FIG. 1 shows an output image 122 produced by the transforming component 104. The output image 122 specifically reveals that the transforming component 104 has removed the tint 120 caused by the electronic screen 108, but, in this particular example, preserves the shadow 118 caused by the artificial light source 112. The explanation below will expand on each of the panels of FIG. 1 summarized above.

With respect to panel (A), assume that the user 106 is seated at a desk or table within one or more feet of the surface of the electronic screen 108. Further assume that the electronic screen 108 is part of a display device that is coupled to a separate user computing device (not shown) via a display cable (not shown). In other cases, the electronic screen 108 is part of a display device that is integrated with the computing device. For example, the electronic screen 108 can be part of a display device of a laptop computing device or handheld computing device (such as a smartphone). In still other cases, the electronic screen 108 is part of a television set, a game console, an electric sign, an intelligent appliance, etc. More generally, the electronic screen 108 can be the display surface produced by a liquid crystal display device, a light-emitting diode display (LED) device, a cathode ray tube device, a projection mechanism, etc.

In the specific case of FIG. 1, the user 106 is currently engaged in a videoconferencing session using a videoconferencing application, such as the TEAMS application provided by Microsoft Corporation of Redmond, Washington. Windows 124 show images of the faces of two of the videoconferencing participants with whom the user 106 is interacting, although the user 106 can interact with any number of videoconferencing participants. A window 126 shows text that the user 106 is reviewing simultaneously with the videoconferencing session. For example, the user 106 may have received an Email or text message during the course of the videoconferencing session. The user 106 activates the window 126 to review the contents of the Email or text message. Assume that the Email or text message is private, and therefore the user 106 does not wish to share it with the other videoconferencing participants. Although not shown, the electronic screen 108 may also include a window that shows the output image 122 produced by the transforming component 104. This window would provide guidance to the user 106 as to whether deleterious visual effects caused by the light emitted by the electronic screen 108 and/or other source(s) have been satisfactorily removed.

In the example of FIG. 1, the camera 114 is a video camera that captures a stream of frames of at least the user's face. Each frame corresponds to an image processed by the transforming component 104. Assume that the video camera has a field 128 that encompasses at least the user's face. In other cases, the camera 114 periodically takes individual snapshots of the user's face, each of which is processed by the transforming component 104.

With respect to the middle panel (B), the user's face reacts to light impinging its surface in typically complex ways. For instance, different parts of the face may absorb and reflect different wavelengths of incident light based on many factors, such as the user's complexion, the varying oil content of the user's face, the presence of light from other illumination sources, the orientation of the user's face relative to the electronic screen 108, the distance of the user's face from the electronic screen 108, etc. The visual effect exhibited by the input image 116 may depend on any of these factors.

In the merely illustrative case of FIG. 1, assume that the window 126 that presents the Email or text message has a main background color, such as blue. The face region of the input image 116 may consequently exhibit a blue tint 120 which is attributable to reflections from the window 126. In other cases, the user 106 may be watching a video or other animated content. Here, a sequence of input images exhibit a dynamic visual effect that changes in the course of presentation of the video or other animated content. For example, assume that a commercial includes flashing images of different main colors and/or intensity. The face region of the input images will exhibit dynamically varying tints, possibly with dynamically varying intensity levels, in the course of presentation of the commercial. Oily parts of the user's face can potentially reveal even more fine-grained detail regarding the display information presented by the electronic screen 108. For instance, the nose of the user 106 can potentially reflect some features of an image or text document that the user is viewing at a given time.

There are multiple reasons why the user 106 may wish to eliminate any evidence of the content he is viewing on the electronic screen 108. For example, the information presented by the electronic screen 108 may include confidential information, such as medical information, financial information, attorney-client privileged documents, sensitive personal communications, etc. The user may be operating under an obligation or expectation to preserve the secrecy of this information. Alternatively or in addition, the information may not be classified as "secret" per se, but the user may nonetheless wish to eliminate all clues that he is consuming this information. For example, assume that the user 106 is currently interacting with his work colleagues while simultaneously watching a video clip. The video clip is not "secret" per se, but the user 106 may wish to conceal the fact that he is not giving undivided attention to his work colleagues.

Alternatively or in addition, the user 106 may wish to improve the quality of the images provided to the videoconferencing participants. For example, the video clip that the user 106 is watching may clause a flicker effect in the input images captured by the camera 114. The user 106 may wish to remove this effect to avoid distracting the other videoconferencing participants during the videoconferencing session. The user 106 may also be generally dissatisfied with the appearance of the input image 116, e.g., because it is perceived as too dark. A dark input image 116 may be caused by the capture of the input image 116 in a room without adequate artificial and/or natural lighting.

With respect to the bottom panel (C) of FIG. 1, the transforming component 104 selectively removes the visual effects attributed to the electronic screen 108, while, in some implementations, preserving other visual effects caused by other illumination sources. Further, the transforming component 104 performs this operation without receiving an input signal that describes the actual display illumination provided by the electronic screen 108. In other words, the transforming component 104 performs its analysis based on just the input image 116 captured by the camera 114. It does not receive an independent input signal or other information that specifies what content is being presented on the electronic screen 108 and/or how the electronic screen 108 is presenting the content. For example, the transforming component 104 removes the blue tint 120 present in the input image 116 without receiving any a priori information that indicates that the window 126 is currently displaying information having a blue-colored background. Rather, the transforming component 104 infers the fact that the blue tint 120 is a deleterious visual effect based on the manner it has been trained (to be described in detail below). By virtue of this manner of operation, the transforming component 104 further preserves the privacy of the user. For instance, the user 106 is not forced to divulge the contents of the electronic screen 108 to a third-party service that provides the transforming component 104. This is especially beneficial when the transforming component 104 is implemented by a remote server (or servers), but also applies to the case in which the transforming component 104 is locally implemented by each user computing device.

Although not shown, the transforming component 104 is also capable of removing or obscuring more complex types of display content, e.g., besides a tint. For example, assume that the user is reading a text document, and reflections on oily parts of the user's nose provide some evidence that the user is consuming text on the electronic screen 108, although the evidence may be insufficient to discern the specific words of the text. Reflections on the user's eye glasses can potentially reveal even more detail. The transforming component 104 is given no advance information regarding the contents of the text, or even the fact that the electronic screen 108 is presenting text. But based on its training, the transforming component 104 can nonetheless infer that the text is content that is not a natural part of a human's face. This may cause the transforming component 104 to remove or obscure this content in the output image 122.

The transforming component 104 also improves the quality of the input image 116, e.g., by increasing the intensity of the input image 116 to a prescribed level and/or by correcting coloring mismatches. This is particularly beneficial in those cases in which the user 106 is operating in an environment having inadequate lighting, in which case the influence of the screen illumination from the electronic screen 108 is particularly pronounced. In the context of a videoconferencing session, each participant of the teleconferencing session may use an individual instance of the transforming component to produce an output image. This has the effect of giving all of the output images a consistent appearance (including a consistent intensity level and coloring). This outcome, in turn, may have the perceived social effect of equalizing all of the participants regardless of their ability to provide adequate lighting for the videoconferencing session. Details will be provided below to explain how the transforming component 104 can increase the perceived level of brightness of the input image 116 and/or correct coloring mismatches and inconsistencies.

More generally, the visual effect caused by screen illumination is just one of the source conditions that may cause the generation of an unsatisfactory output image. Other factors include: the display settings of the electronic screen 108; the physical characteristics of the electronic screen 108; the camera settings of the camera 114 (such as the auto-white balance (AWB) function); other characteristics of the camera 114; any external source(s) of illumination besides the electronic screen 108 that direct light on the user's face (such as a red lamp or infrared lamp); characteristics of the natural light; characteristic of the room (such as a tinted window shade illuminated by the sun); characteristics of the electronic equipment that processes the input image (such as compression algorithms), and so on. The transforming component 104 removes the visual effect caused by any combination of these sources (including, in some cases, the visual effect caused by the content presented by the electronic screen 108). To facilitate explanation, however, most of the examples presented below will assume, without limitation, that the screen illumination provided by the electronic screen 108 is the principal source of deleterious visual effects in in the input image 116.

In the example of FIG. 1, the transforming component 104 preserves visual effects caused by other sources of illumination besides the electronic screen 108. But in view of the generalization set forth above, in some implementations, the transforming component 104 is trained to remove a visual effect caused by any source(s), not limited to the screen illumination.

Further note that the term screen illumination encompasses the display information that is presented by the electronic screen 108 and/or other characteristics of the electronic screen 108 that influence the light it produces (such as its display settings).

Further note that most of the examples presented below assume that the face region of the input image is the target region of primary interest to which the transforming component 104 is applied. More generally, however, the transforming component 104 can transform any region(s) of interest in the input image 116, not limited to the face region. In yet other implementations, the transforming component 104 transforms the entire input image 116 without discriminating among its parts.

Figure 2:
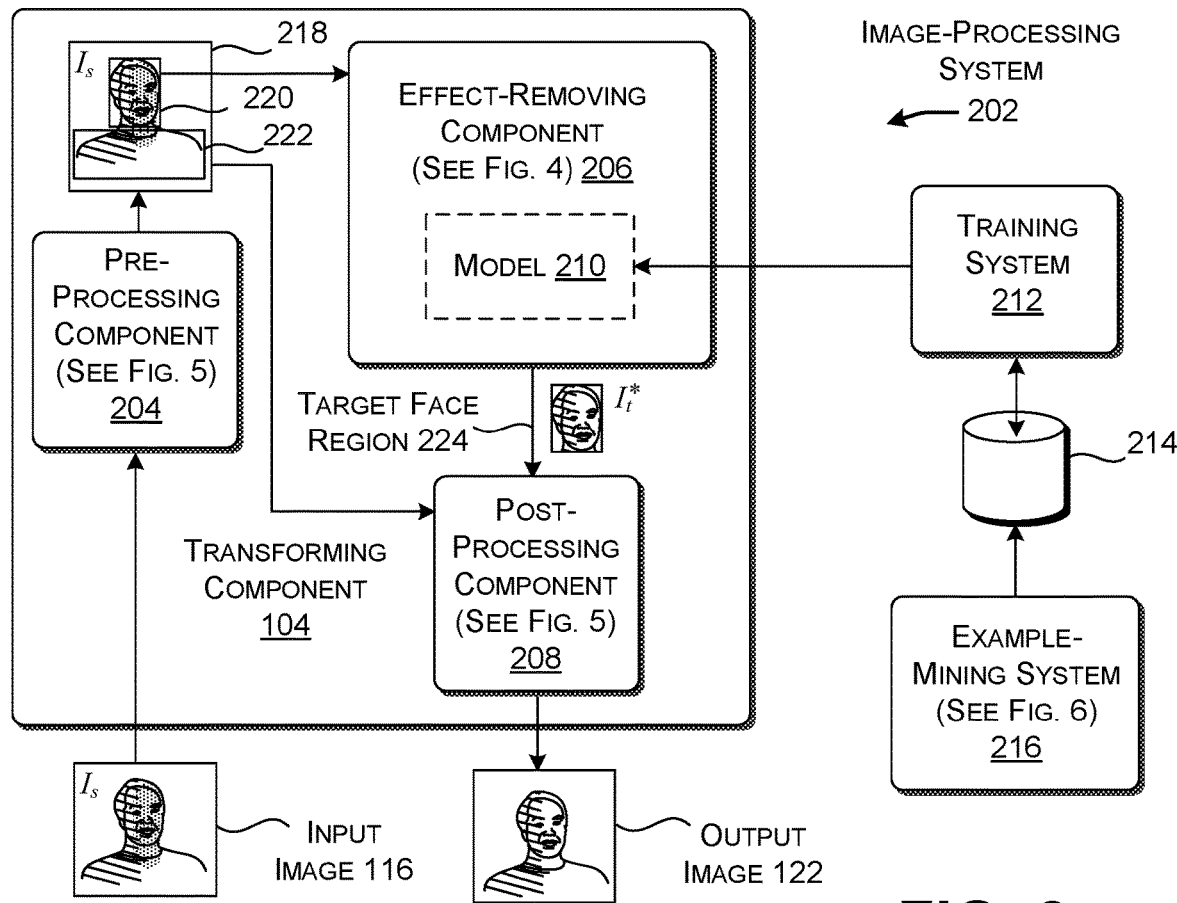
FIG. 2 shows one implementation of the image-processing system.

FIG. 2 shows one implementation of an image-processing system 202 that performs the functions shown in FIG. 1. The image-processing system 202 includes the transforming component 104, which, in some implementations, includes a pre-processing component 204, an effect-removing component 206, and a post-processing component 208. Overall, the transforming component 104 uses a machine-trained model 210 to remove the visual effect caused by screen illumination provided the electronic screen 108 (among other possible source(s)). In the context of FIG. 1, the transforming component 104 transforms the input image 116 to the output image 122.

A training system 212 trains the machine-trained model 210 based on training examples in a data store 214. An example-mining system 216 produces the training examples. The example-mining system 216 constructs the training examples by simulating virtual environments contains simulated users who interact with simulated electronic screens, subject to illumination caused by different simulated light sources, or, more generally, different source conditions. A simulated electronic screen is one such simulated light source. Further information regarding the operation of the example-mining system 216 and the training system 212 is provided below in the context of the explanation of FIGS. 6-8.

In some implementations, the pre-processing component 204 of the transforming component 104 produces a segmented image 218 based on the input image 116. The pre-processing component 204 performs this task by performing object recognition and object tracking to identify the objects present in the input image 116, and then performing cropping to identify regions associated with those respective objects. A developer can define a set of objects of interest to be detected. In some implementations, the pre-processing component 204 determines a source face region 220 that corresponds to image content containing the face of the user 106, and one or more other regions in the input image 116 associated with objects other than the face. In the example of FIG. 2, the pre-processing component 204 identifies a torso region 222 that corresponds to image content showing the upper body of the user 106. In other examples, the pre-processing component 204 can establish regions for other body parts, other people, furniture items, room parts, and so on. Further information regarding the operation of the pre-processing component 204 is provided below in the explanation of FIG. 5.

The effect-removing component 206 uses the machine-trained model 210 to transform the source face region 220 to a processed image, which, in some implementations corresponds image content showing a target face region 224. In other implementations, the effect-removing component 206 transforms the original input image 116 to the processed image (e.g., the target face region 224) without first explicitly identifying the source face region 220. In either case, the effect-removing component 206 removes the visual effect in the input image 116 that is attributable, at least in part, to light cast on the user's face by the electronic screen 108, while, in some implementations, preserving the visual effects in the input image 116 caused by other light sources besides the electronic screen 108. The effect-removing component 206 also improves the quality (e.g., level of intensity and coloring) of the input image 116, at least with respect to the source face region 220. Further information regarding the operation of the effect-removing component 206 is provided below in the explanation of FIG. 4. The term "source face region" is to be considered synonymous with "source face image part," and the term "target face region" is to be considered synonymous with "target face image part."

The post-processing component 208 adjusts one or more other regions of the input image 116 based on the target face region 224. The post-processing component 208 performs this task with the objective adjusting the other region(s) so that they are consistent with the appearance (e.g. intensity and coloring) of the target face region 224. For instance, assume that the target face region 224 has an overall intensity level that is greater than the overall intensity level of the torso region 222 of the user's body. The post-processing component 208 can increase the intensity level of the torso region 222 to match the intensity level of the target face region 224. The post-processing component 208 can also modify the torso region 222 such that its coloring is consistent with the coloring of the target face region 224.

In some implementations, the post-processing component 208 can extend this adjustment to other objects that may appear in the input image 116, including any of: other body parts of the user 106; the body of the user 106 as a whole; furniture items; the bodies (or body parts) of other people; all objects within a prescribed radius of a center point of the user's face; all objects in the input image 116; the input image 116 as a whole, etc. Further information regarding the operation of the post-processing component 208 is provided below in the explanation of FIG. 5.

Figure 3:
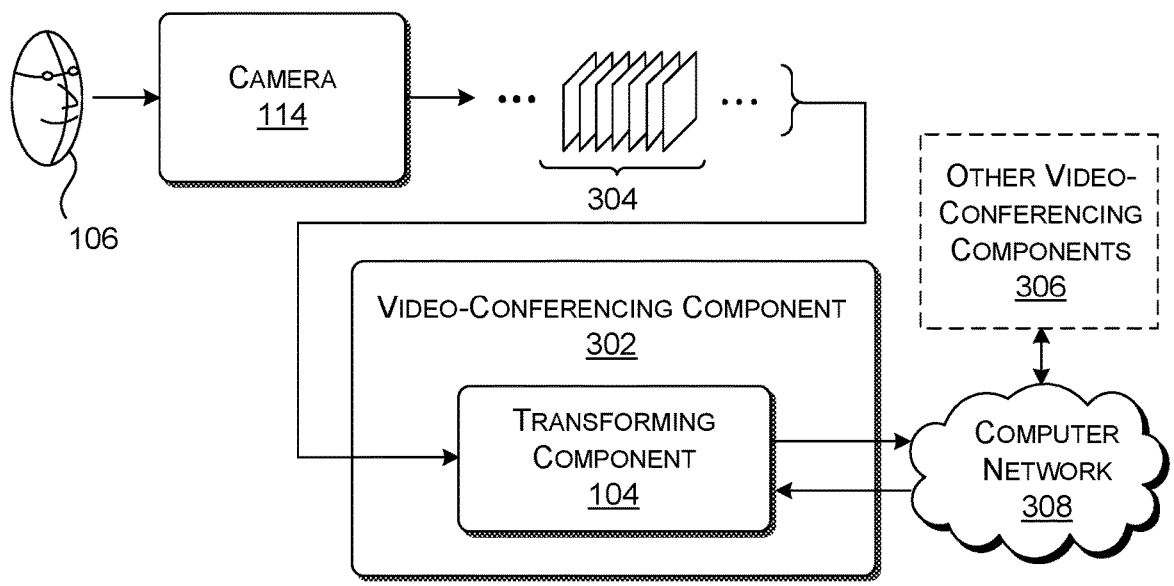
FIG. 3 shows one application that makes use of the image-processing system of FIG. 2.

FIG. 3 shows a videoconferencing component 302 that includes the transforming component 104. In some implementations, the video conferencing component 302 corresponds to an application installed on the user's computing device (corresponding to any of a desktop computing device, laptop computing device, game console, handheld computing device of any type, etc.). The transforming component 104 removes the visual effect of in an input video 304 captured by the camera 114 caused by any source(s), such as the electronic screen 108. The transforming component 104 also improves the quality of the input video 304. This produces output images. The videoconferencing component 302 sends the output images to the videoconferencing participants with whom the user 106 is interacting, in lieu of the original input images in the input video 304.

Other videoconferencing components 306 operated by the other videoconferencing participants receive the processed images. Because the processed images are transformed to remove the visual effect caused by the electronic screen 108, the other videoconferencing participants are not given clues that allow them to infer the content on the electronic screen 108. The other videoconferencing participants also benefit from the improved quality exhibited by the output images. The other videoconferencing components 306 perform functions that are complementary to the videoconferencing component 302. That is, each videoconferencing component at a particular site removes deleterious effects from input video captured at that site, while improving the quality of the input video. A computer network 308, such as the Internet, enables communication among the videoconferencing components (302, 306).

In other implementations, a web application or other remote service or other remote service implements one or more instances of the videoconferencing components (302, 306), e.g., using one or more servers. In other implementations, the functionality associated with the videoconferencing components (302, 306) is distributed among local and remote resources.

In other implementations, the transforming component 104 performs its effect-removing operation upon receiving frames of input video from another participant. For instance, a user can selectively invoke the transforming component 104 to remove distracting artifacts in the input video 304 that is received from another participant.

In some implementations, the transforming component 104 produces the output video by separately transforming each individual video frame (that is, by transforming each single input image). In other implementations, the transforming component 104 takes into consideration plural video frames when producing the output video. For example, the transforming component 104 can provide a smoothing function that reduces abrupt changes in the output video, e.g., by using a sliding window to average or otherwise blend the transformation effects computed for individual consecutive video frames. This operation can be performed by the effect-removing component 206 and/or the post-processing component 208 and/or some other component (not shown). To facilitate explanation, however, the examples presented below will assume that the transforming component 104 maps each individual input video frame to an output video frame.

Other applications can make use of the transforming component 104 besides the videoconferencing component 302. For example, a photo editor can use the transforming component 104 to remove artifacts from digital photographs. The photo editor can be integrated with a camera, and can automatically perform correction each time a digital photograph is captured. Alternatively, or in addition, the photo editor can perform correction on previously captured photographs upon instruction from a user. In other cases, the photo editor is implemented by a separate computing device, and can perform correction at any time on images captured from any source(s), including images created by any source(s), and downloaded from the Internet. A video editor can make use of the transforming component 104 in the same way as the photo editor.

Figure 4:
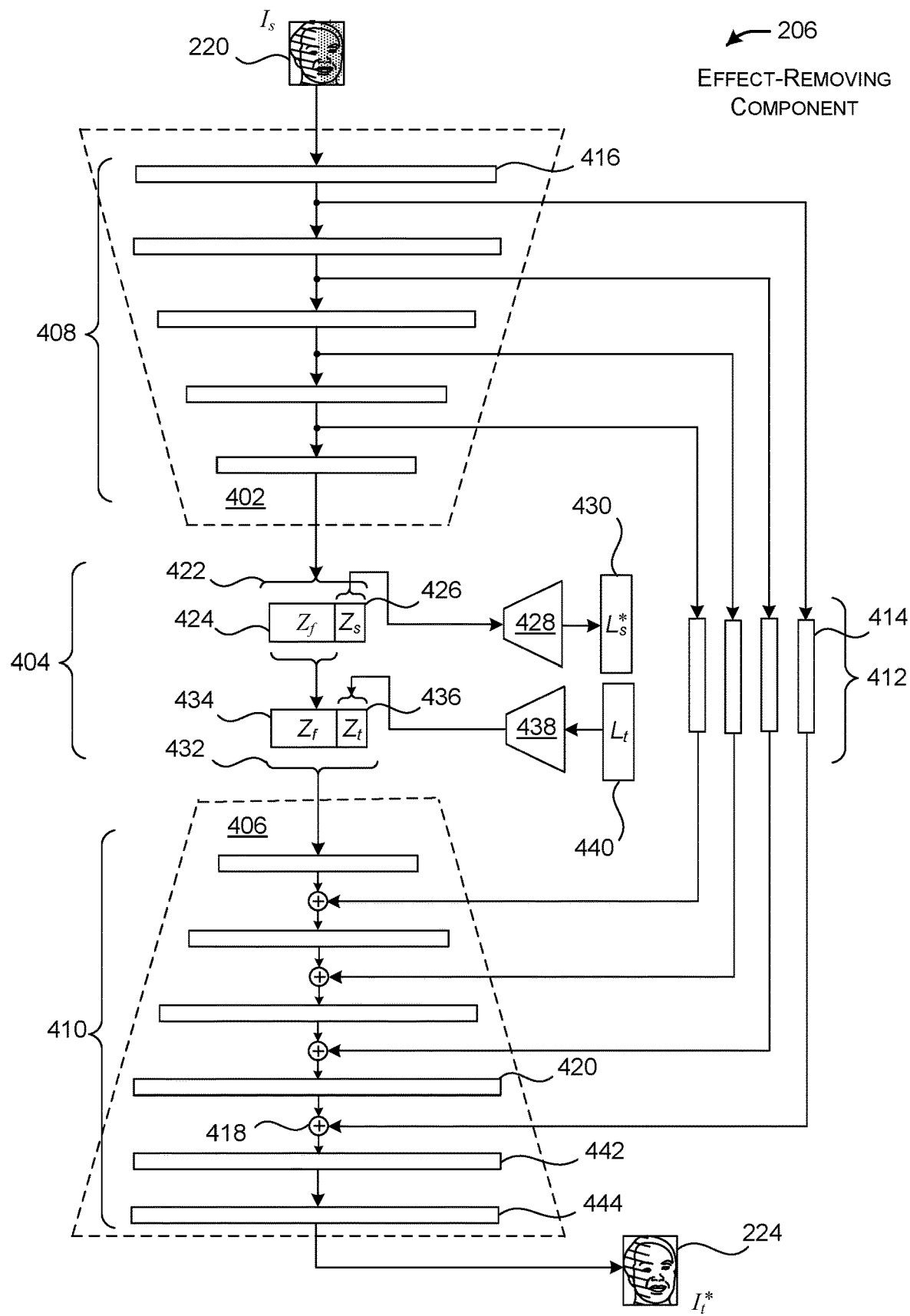
FIG. 4 shows one implementation of an effect-removing component, which is one part of the image-processing system of FIG. 2.

FIG. 4 shows one implementation of the effect-removing component 206. In this specific example, assume that the effect-removing component 206 transforms the source face region 220 to the target face region 224. Again, a face region corresponds to a portion of image content that shows the face of a user. In other cases, the effect-removing component 206 performs analysis directly on the entirety of the input image 116, or a pre-processed image that is produced based on the input image 116.

The effect-removing component 206 includes an encoder 402 that transforms the source target face region 224 into intermediate feature information 404, and a decoder 406 that maps the intermediate feature information 404 to the target face region 224. In some implementations, the encoder 402 is implemented by a neural network having plural encoder processing blocks 408. At least some of the encoder processing blocks 408 perform a down-sampling function. That is, such an encoder processing block maps input image information having a first number of channels to output image information having a second number of channels, where the second number of channels is less than the first number of channels.

In some implementations, the decoder 406 is implemented by a neural network having plural decoder processing blocks 410. At least some of the decoder processing blocks 410 perform an up-sampling function. That is, such a decoder processing block maps input image information having a first number of channels to output image information having a second number of channels, where, in this case, the second number of channels is greater than the first number of channels.

Skip connection processing blocks 412 transform instances of output image information produced by respective encoder processing blocks 408 into skip-connection-processed image information. The decoder 406 combines the skip-connection-processed image information with respective instances of output image information produced by the decoder processing blocks 410. For example, an illustrative skip connection processing block 414 maps output image information produced by a first encoder processing block 416 into skip-connection-processed image information. A combiner 418 of the decoder 406 combines (e.g., adds) the skip-processed image information with output image information produced by a particular decoder processing block 420.

The encoder 402 produces original feature information 422 having two parts. A first part ($Z_f$) 424 describes characteristics of the user's face, independent of the visual effect caused by the electronic screen 108. In some implementations, a second part ($Z_s$) 426 is dedicated to describing only characteristics of the visual effect caused by the electronic screen 108. A processing component 428 regresses the second part ($Z_s$) 426 of the original feature information 422 into output information 430 ($L_s^*$). The output information 430, which is used in a training phase, provides a prediction of the visual effect exhibited by the input image 116 that is attributable to the electronic screen 108, and, in some implementations, not to other sources of illumination (such as natural illumination and artificial illumination).

The decoder 406 operates on modified feature information 432. The modified feature information 432 also has two parts, including a first part 434 ($Z_f$) that describes characteristics of the user's face, independent of the visual effect caused by the electronic screen 108. The first part 434 of the modified feature information 432 contains the same information as the first part 424 of the original feature information 422. A second part ($Z_t^*$) 436 of the modified feature information 432 describes characteristics of the visual effect that would have been caused by target screen illumination had the electronic screen 108 provided the target screen illumination, instead of source screen illumination that it actually provided. The effect-removing component 206 produces the modified feature information 432 by replacing the second part 426 of the original feature information 422 with the second part 436, e.g., by concatenating the first part 426 (which is the same as the new first part 434) with the new second part 436. The target face region 224 will omit the visual effect caused by actual source screen illumination provided by the electronic screen 108 because the part of the original feature information 422 that describes the visual effect caused by the actual source screen illumination has been removed and replaced with the new second part 436.

In other implementations (not shown), the encoder 402 can produce a second part $Z_s$ 426 that describes a visual effect caused by plural sources, including, e.g., the electronic screen 108, but not limited to the electronic screen 108. In other implementations, the encoder 402 can produce plural second parts $Z_{s1}$, $Z_{s2}$, $Z_{s3}$, etc. attributed to plural respective sources ($S_1$, $S_2$, $S_3$, etc.). In each such variation, the decoder 406 processes second part information 436 $Z_t$ that complements the second part information 426 produced by the encoder 402.

As noted above, screen illumination encompasses the information that the electronic screen 108 displays and/or how the electronic screen 108 presents the information (as governed by its display settings, etc.). As such, the source screen illumination is caused by source screen information and/or other source screen characteristics, and the target screen illumination is caused by simulated target display information (that is not actually displayed) and/or other target screen characteristics (that may not actually be present in the user's environment during the capture of the input image 116). The following examples, however, will mainly present the simplified case in which the visual effect caused by the electronic screen 108 is primarily caused by the content it presents, and the target screen illumination achieves its corrective effect via new target display information that differs from the source display information.

In some implementations, the target display information is generic content that can have any characteristics, but is generally designed to omit sensitive information or information that impairs the quality of the target face region 224. The target display information is also designed to provide satisfactory relighting of the source face region 220. In some implementations, the target display information corresponds to a monolithic single-colored block (e.g., a white-colored screen) that would have the effect of uniformly increasing the intensity ("lightness") of the source face region 220 and/or correcting its coloring. In other cases, the target display information can include two or more colors, and/or two or more intensity levels, etc. A processing component 438 produces the second part 436 by transforming input information 440 (L b) that describes the target display information. The decoder 406 operates on the modified feature information 432 instead of the original feature information 422, to produce the target face region 224.

In some implementations, an encoder processing block that performs down-sampling is implemented by one or more processing subcomponents, e.g., corresponding to one or more layers of a neural network. These processing subcomponents include any combination of: one or more convolutional components, one or more pooling components, one or more residual connections, one or activation functions (e.g., the ReLU activation function), one or more normalization components, etc. For instance, in some implementations, an encoder processing block is implemented by at least one convolutional component followed by a pooling subcomponent.

Each convolutional component (not shown) performs a convolution operation that involves moving a nxm kernel (e.g., a 3×3 kernel) across input image information supplied to the convolutional component. At each position of the kernel, the convolutional component generates the dot product of the kernel values with the underlying values of the input image information, to produce output image information. The pooling component (if used) down-samples results of a preceding convolutional operation using any kind of sampling function, such as a maximum operation that selects a maximum value within a subset of values. Alternatively, a convolutional component itself can perform down-sampling by appropriate selection of its stride, without the use of a separate pooling component. The stride of a convolutional operation defines the size of the steps at which it performs computations over the input image information.

In some implementations each decoder processing block is also implemented by one or more subcomponents. In some implementations, for example, each decoder processing block that performs up-sampling is implemented by one or more convolutional components. A convolutional component that operates on input image information performs up-sampling by applying, for example, bilinear interpolation on the input image information.

In some implementations, each skip connection processing block is implemented by one or more subcomponents, such as one or more convolutional components. Likewise, a encoder processing block that does not perform down-sampling, or a decoder processing block that does not perform up-sampling, can be implemented by one or more subcomponents, such as one or more convolutional components. Encoder processing block 416 is an example of an encoder processing component that does not perform down-sampling. Decoder processing blocks 442 and 444 are examples of decoder processing blocks that do not perform up-sampling. Generally, a smaller size of an encoder processing block relative to its preceding encoder processing block (if any) indicates that a down-sampling operation has been performed by the preceding encoder processing block. A larger size of a decoder processing block relative to its preceding decoder processing indicates that an up-sampling operation has been performed by the preceding decoder processing block. In some implementations, each of the processing components (428, 438) is implemented by a feed-forward neural network having any number of layers.

Other implementations of the effect-removing component 206 can use other neural network architectures compared to the architecture shown in FIG. 4 and described above. For example, another implementation of the effect-removing component 206 uses a U-Net architecture, such as the type of architecture described in RONNEBERGER, "U-Net: Convolutional Networks for Biomedical Image Segmentation," in Cornell University arXiv library, arXiv: 1505.04597v1 [cs.CV], May 18, 2015, 8 pages. Another implementation of the effect-removing component 206 uses a transformer-based architecture. Background information regarding transformer-based technology is provided by VASWANI, et al., "Attention Is All You Need," Cornell University arXiv library, arXiv:1706.03762v5 [cs.CL], Dec. 6, 2017, 15 pages.

Figure 5:
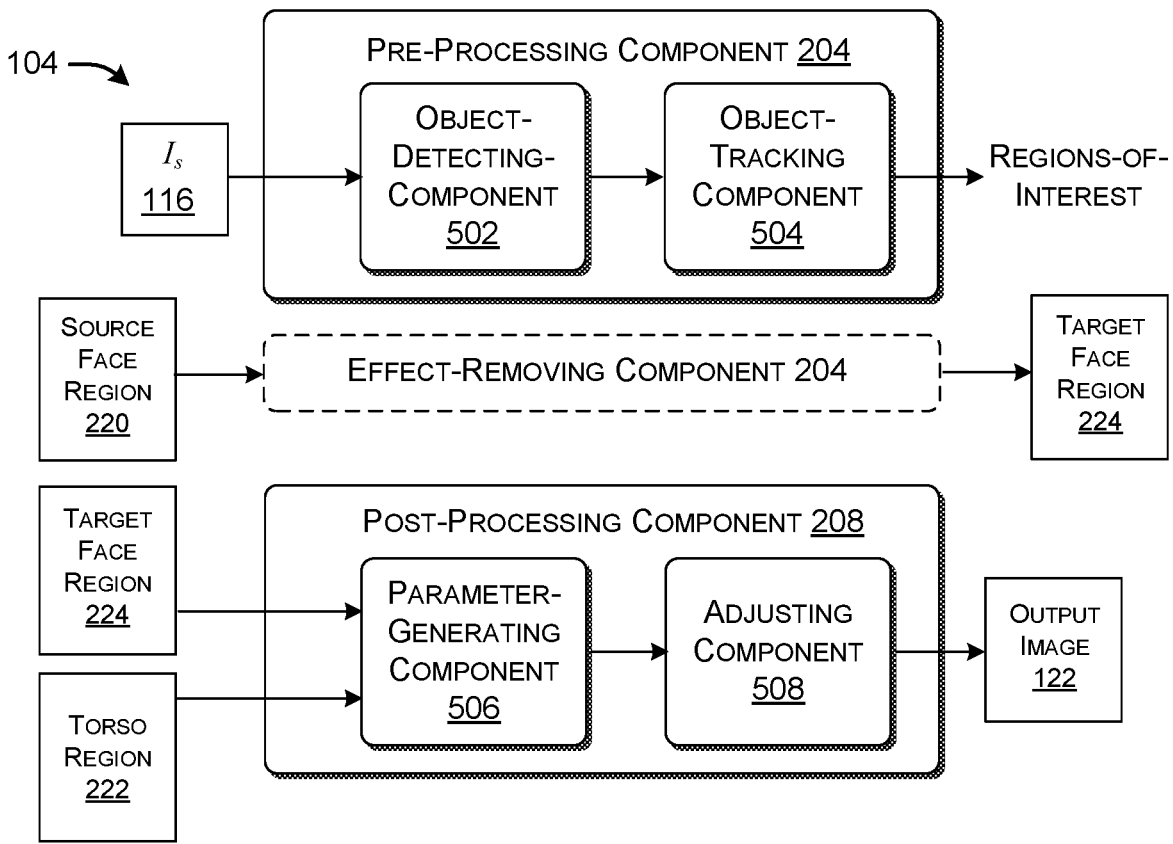
FIG. 5 shows one implementation of a pre-processing component and a post-processing component that, in some implementations, are used in the image-processing system of FIG. 2.

FIG. 5 shows one implementation of the pre-processing component 204 and the post-processing component 208. These components (204, 208) are described for the case in which the effect-removing component 206 transforms the source face region 220 to the target face region 224, although, as stated, this is only one implementation among others.

With respect to the pre-processing component 204, an object-detecting component 502 detects objects in the input image 116. In some implementations, the object-detecting component 502 detects specified types of objects of interest, such as faces, other body parts, other people, furniture, room parts, etc. An object-tracking component 504 tracks detected objects over the course of the frames of an input video, the input image 116 being one from the input video.

More specifically, in some implementations, the object-detecting component 502 can detect objects in one or stages. In a first stage, the object-detecting component 502 uses a base convolutional neural network (CNN) to convert the input image 116 into feature information. In a second stage, a detection head uses CNN technology to define a plurality of candidate regions of analysis (e.g., candidate bounding boxes) over the input image 116. For each candidate region of interest, and for each object of interest (such as a face), the detection head determines a probability that the candidate region of analysis contains that object of interest. This yields a plurality of candidate detections. In a third stage, the detection head uses the non-maximum suppression algorithm to reduce the number of candidate detections.

More generally, the object-detecting component 502 can use many different techniques to detect objects in an image and to determine bounding boxes associated with those respective objects. General background information on the stand-alone topic of machine-learned object detection can be found in: REN, et al., "Faster R-CNN: Towards Real-Time Object Detection with Region Proposal Networks," Cornell University arXiv library, arXiv:1506.01497v3 [cs.CV], Jan. 6, 2016, 14 pages; LIU, et al., "SSD: Single Shot MultiBox Detector," Cornell University arXiv library, arXiv: 1512.02325v5 [cs.CV], Dec. 29, 2016, 17 pages; and REDMON, et al., "You Only Look Once: Unified, Real-Time Object Detection," Cornell University arXiv library, available at arXiv:1506.02640v5 [cs.CV], May 9, 2016, 10 pages.

The object-tracking component 504 identifies candidate trajectories of the objects detected by the object-detecting component 502 across the frames of input video. In some implementations, the object-tracking component 504 performs this task using a Kalman filter. The object-tracking component 504 then associates objects detected by the object-detecting component 502 with trajectories computed by the object-tracking component 504. In some implementations, the object-tracking component 504 performs this task using the Hungarian algorithm (e.g., the Kuhn-Mukres algorithm). This algorithm performs the assignment task using a cost matrix that describes the costs of adding the detected objects to different trajectories.

General background information on the stand-alone topic of object tracking can be found at: CIAPARRONE, e al., "Deep Learning in Video Multi-Object Tracking: A Survey," Cornell University arXiv library, arXiv:1907.12740v4 [cs.CV], Nov. 19, 2019, 42 pages; and LUO, et al., "Multiple Object Tracking: A Literature Review," Cornell University arXiv library, arXiv:1409.7618v5 [cs.CV], Feb. 11, 2022, 49 pages.

With respect to the post-processing component 208, in some implementations, a parameter-generating component 506 generates parameter information that is a function of the source face region 220 and the target face region 224. For example, the parameter-generating can divide the source face region 220 by the target feature region 222 by dividing each pixel of the source face region 220 by each counterpart pixel in the target face region 224, and then averaging the results of this operation. In some implementations, the parameter-generating component 506 perform its operation by separately dividing each red, green, and blue component of a source pixel by each corresponding red, green, and blue component of a corresponding target pixel. This yields three quotient values for each pixel. The parameter-generating component 806 then generates a first parameter value e r by averaging all of the red quotient values, a second parameter value e g by averaging all of the green quotient values, and a third parameter value e b by averaging all of the blue quotient values. Other implementations can generate parameter information in other ways, such as by computing the respective intensities of the pixels and dividing corresponding pixel intensity values.

An adjusting component 508 uses the parameter information computed by the parameter-generating component 506 to adjust the pixel values of at least one other object in the input image 116 other than the face region 220. For example, consider the torso region 222 shown in FIG. 2. The adjusting component can multiply the red, green, and blue components of each pixel in the torso region 222 by the values $e_r$, $e_g$, $e_b$, respectively. This operation has the effect of correcting intensity and/or coloring mismatches between the torso region 222 and the target face region 224. The operation is also efficient because the transforming component 104 need only perform detailed analysis on the face region 220, not every object in the input image 116.

Other implementations can compute the parameter information using other technique(s). For example, other implementations can process the source face region and the target face region by some technique other than, or addition to, a division operation, including any of: adding the regions together; subtracting one region from the other region; concatenating the regions together; applying a logarithmic and/or exponential function to the regions; processing the regions using a lookup mapping table or neural network, and so on. Other implementations can consolidate pixel-level parameter information using other techniques, besides, or in addition to, an averaging operation, including any of: a median-computing operation; a maximum or minimum-finding operation; a mean-trimming operation, and so on. In addition, or alternatively, other implementations of the post-processing component 208 can provide plural parameter values for different sub-regions of the face region, such as by providing an n×n grid of parameter values which the post-processing component 208 applies appropriately to the region of interest being corrected.

Figure 6:
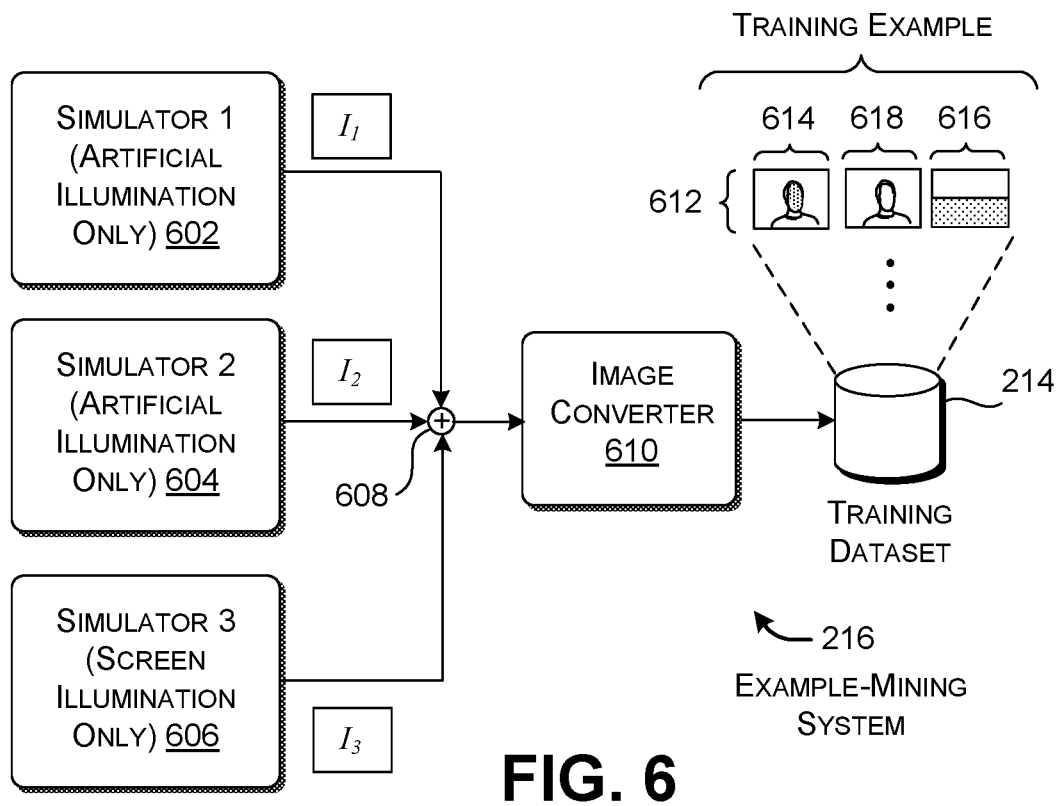
FIG. 6 shows one implementation of an example-mining system, which is another part of the image-processing component of FIG. 2.

FIG. 6 shows one implementation of the example-mining system 216 introduced in FIG. 2. The example-mining system 216 produces training examples for storage in the data store 214. The training system 212 (not shown in FIG. 6) uses the training examples to train the machine-trained model 210. In some implementations, the example-mining system 216 operates by creating at least one virtual environment that contains a simulated user face, a simulated electronic screen that presents simulated display information, and one or more simulated light sources. One simulated light source corresponds to simulated screen illumination produced by the simulated display information presented by the simulated electronic screen itself and/or any other characteristics of the simulated electronic screen that affect the light it produces. Other simulated light sources include a simulated artificial light source and a simulated natural light source. The simulated light source(s) produce a simulated visual effect on the face of the simulated face of the user. The example-mining system 216 produces an example image that captures this visual effect, e.g., by simulating the operation of an actual camera. More generally stated, the example-mining system 216 produces different examples images under different simulated source conditions that include, in some cases, different kinds of simulated screen illumination produced by the simulated electronic screen.

In some implementations, the example-mining system 216 uses a conventional 3D graphics pipeline to produce the virtual environment. A conventional graphics pipeline includes elements such as a voxel shader, perspective transformer, backface-culling component, rasterizer, and pixel shader. One such commercially-available graphics pipeline is the DIRECTX product produced by Microsoft Corporation of Redmond, Washington. The example-mining system 216 relies on a library of pre-generated models to produce each simulated environment (such as a simulated room), simulated user face, simulated electronic screen, other simulated light sources, etc. The example images can also take account for different simulated screen settings, different simulated camera settings, etc.

Figure 7:
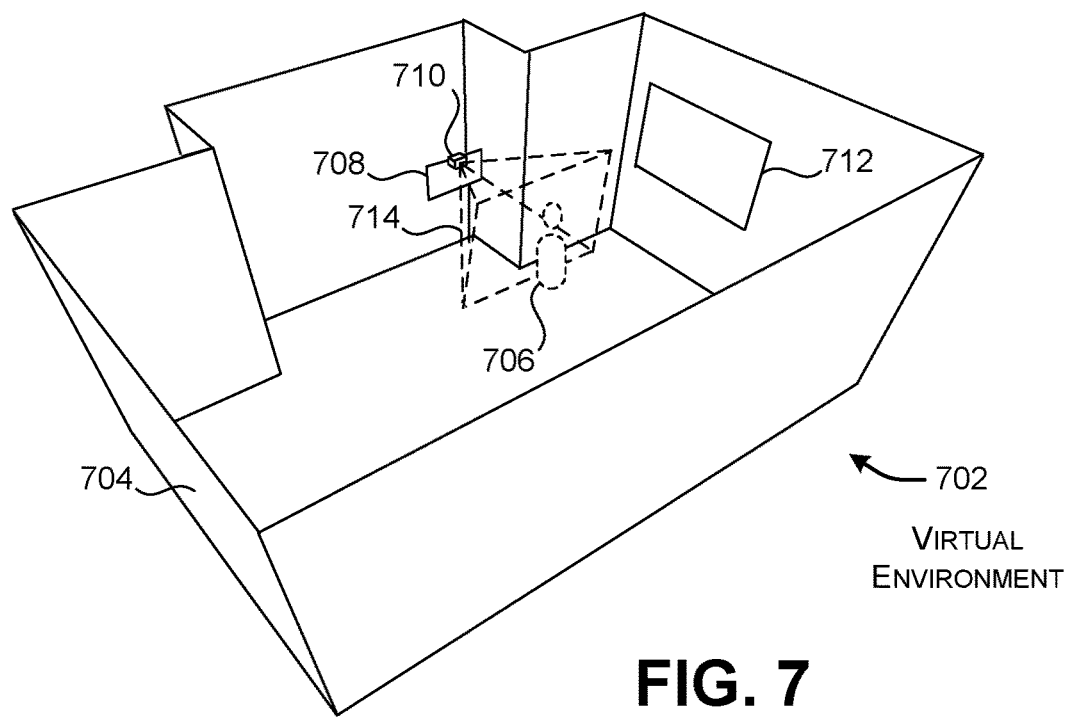
FIG. 7 shows a virtual environment that is used by the example-mining system of FIG. 6 to produce training examples for use in training a machine-trained model used by the image-processing system of FIG. 2.

Advancing momentarily in the sequence of figures, FIG. 7 shows one illustrative virtual environment 702 produced by the example-mining system 216. The virtual environment 702 is a simulated room 704 having a simulated user 706 having a simulated face, a simulated electronic screen 708 that presents simulated display information (not shown) using simulated display settings, a simulated camera 710, a simulated window 712, a simulated artificial light source (not shown), and a simulated natural light source (not shown). Simulated natural light passes through the simulated window 712, and simulated artificial light is emitted by the simulated artificial light source. The simulated camera 710 has a field-of-view 714 that encompasses at least the face of the simulated user 706. The example-mining system 216 models the effect of the simulated light source(s) by projecting light produced by the simulated light source(s) onto the face of the simulated user 706. The simulated camera 710 captures this visual effect in an example image.

Figure 8:
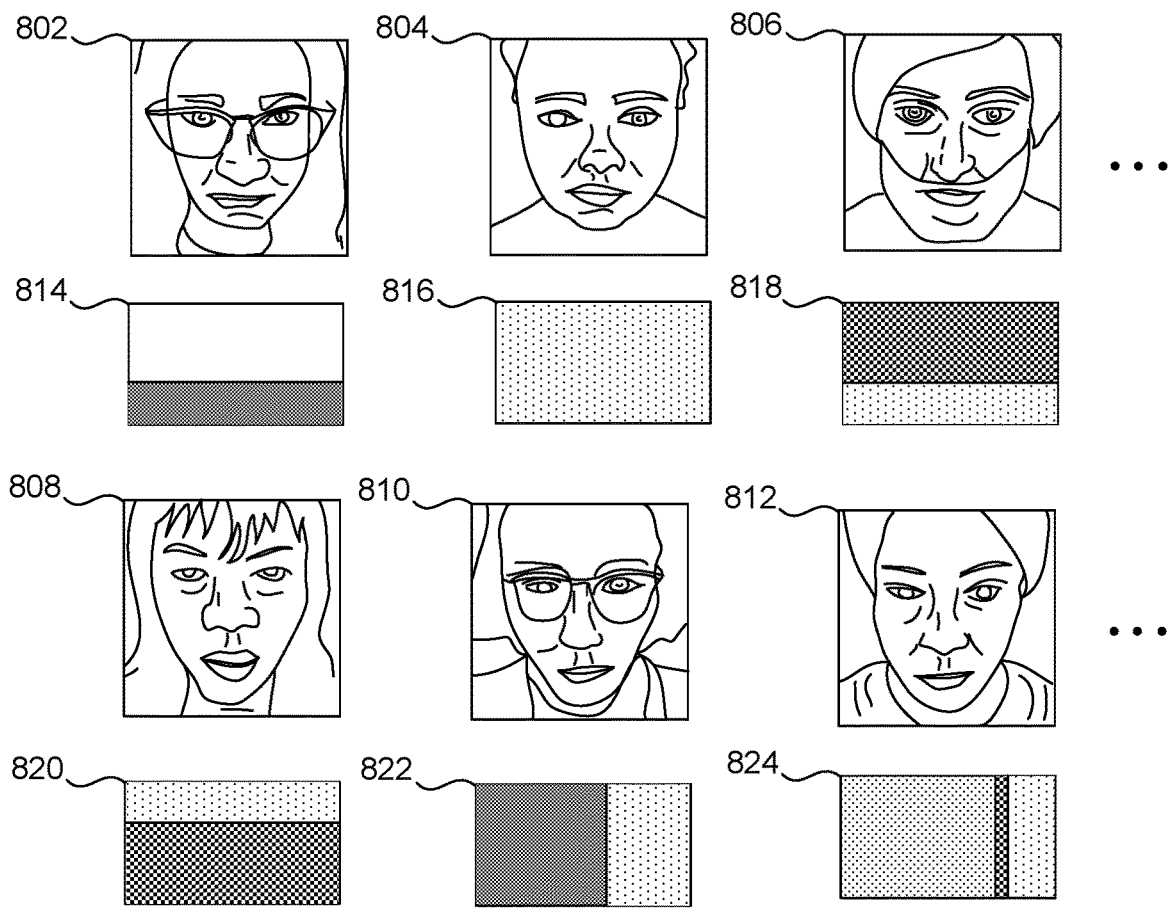
FIG. 8 shows simulated images produced by the example-mining system of FIG. 6.

FIG. 8 shows different simulated user faces (802, 804, 806, 808, 810, and 812) and instances of simulated display information (814, 816, 818, 820, 822, and 824). The simulated faces include different shapes, genders, ethnicities, complexions, ages, hair styles, clothing, accessories (eye glasses, hats, jewelry, etc.) etc. In some implementations, each simulated instance of display information includes one or more blocks having respective colors. For instance, the instance of simulated display information 816 consists of a single yellow-colored block. The instance of simulated display information 814 includes a top white-colored block and bottom blue-colored block. In addition, or alternatively, although not shown in FIG. 8, an instance of simulated display information can contain informational content, such as a picture and/or text. The example-mining system 216 can vary the above configuration along one or more dimensions, including: varying the room type; varying the simulated user face; varying the simulated electronic screen type; varying the number of windows; varying the screen and/or camera settings; varying the placement of each window; varying the types and intensities of light source(s), and so on.

The example-mining system 216 produces an example image based on a particular pairing of a particular simulated face and a particular instance of simulated display information. For example, the example-mining system 216 produces an example image by pairing the simulated face 802 with the instance of simulated display information 814. Generally, the use of simulated content allows a developer to create a set of training examples with reduced cost and speed (compared to generating training examples that include captured images of actual real-world objects). Alternatively, or in addition, the example-mining system 216 can provide training examples that are constructed based on images of actual user faces and actual instances of display information presented by actual electronic screens.

Returning to FIG. 6, some implementations of the example-mining system 216 produce an example image by combining plural component images ($I_1$, $I_2$, $I_3$) produced by respective simulators (602, 604, 606, etc.), all constructed based on the same virtual environment having a simulated room layout, a simulated window placement, a simulated user face, a simulated electronic screen that presents an instance of simulated display information, a simulated camera, etc. The simulators (602, 604, 606), however, produce their respective component images using different respective sources of illumination. For instance, the first simulator 602 uses only artificial light, the second simulator 604 uses only natural light, and the third simulator 606 uses only light emitted by the simulated electronic display. A combiner 608 combines the component images to produce a single initial example image. In some implementations, the combiner 608 performs this operation by forming a weighted average of the component images. In other implementations, a single simulator produces a single initial example image based on a virtual environment in which all of the three-named sources of illumination are active at the same time.

An image converter 610 converts the initial example image into a final example image by transforming it in one or more ways. For example, assume that the initial example image is expressed using the linear RGB standard. The image converter 610 first computes the relative luminance Y of the initial example image, and then scales the initial example image using: $I'=Y_m/Y$, where $Y_m$ is an environment-specific parameter value (e.g., in one case, $Y_m=0.18$), and $I'$ is the scaled example image. The image converter 610 computes the relative luminance using, for example: $Y=0.212*R_{lin}+0.7152*G_{lin}+0.0722*B_{lin}$, where $R_{lin}$, $G_{lin}$, and $B_{lin}$ refer respectively to the red, green, and blue components of the linear RBG image. The image converter 610 then gamma-corrects the image $I'$ using, for example, $\gamma$ of 2.2. This operation involves raising each pixel value in the linear RGB output image to the power of 2.2. Generally, the above-described modifications are performed to create an output image that most closely resembles an output image that could have been produced by an actual camera that measures the visual effects caused by an actual electronic screen on the face of an actual user. Other implementations operate on images expressed using other color standards besides RGB, such as CMYK, manufacturer-specific and application-specific standards, etc.

FIG. 6 shows a particular training example 612 produced by the example-mining system 216. The particular training example 612 includes an example image 614 produced in the manner described above, a description 616 of the instance of simulated display information that was used to produce the example image, and a ground-truth image 618 that shows the face of the user without the visual effect caused by the simulated electronic screen. The example-mining system 216 can produce this ground-truth image 618 by generating an image that omits the contribution of the third simulator 606. The training system 212 also makes reference to a description of target display information (or, more generally, target screen illumination) that will be used to effectively remove the effects caused by the simulated electronic screen.

Now referring to the training system 212 of FIG. 2, in some implementations the training system 212 uses a loss function that incorporates plural loss measures. A first loss measure ($\mathcal{L}_L$) determines the difference between the known display information ($L_s$) and the predicted display information ($L_s^*$) produced by the processing component 428 of FIG. 4. The training system 212 can compute this loss measure using any distance metric, including any of the L2 (Euclidean) distance, Manhattan distance, cosine similarity, etc.

A second loss measure ($\mathcal{L}_I$) measures the difference between the ground-truth predicted image ($I_t$) and the actual predicted image ($I_t^*$) produced by the effect-removing component 206. The training system 212 can compute this loss measure using any distance metric, including any of the L2 (Euclidean) distance, Manhattan distance, cosine similarity, etc.

A third loss measure ($\mathcal{L}_P$) measures the feature-level distance between the ground-truth predicted measure ($I_t$) and the actual predicted image ($I_t^*$) produced by the effect-removing component 206. For example, the training system 212 can use any type of neural network (including any of a convolutional neural network, a transformer-based neural network, etc.) to map the ground-truth predicted image ($I_t$) into first feature information (F ($I_t$)), map the actual predicted image ($I_t^*$) into second feature information (F($I_t^*$)), and then compute the distance between the first feature information and the second feature information, including any of the L2 (Euclidean) distance, Manhattan distance, cosine similarity, etc. Background information on the general topic of convolutional neural networks designed to extract feature information from images of faces can be found in PARKHI, et al., "Deep face recognition, in British Machine Vision Conference, in Proceedings of the British Machine Vision Conference (BMVC), September 2015, pp. 41.1-41.12.

A fourth loss measure ($\mathcal{L}_D$) is produced by using a discriminator component (not shown) of a generative adversarial network (GAN) (not shown) to map the predicted image ($I_t^*$) into an output result (D($I_t^*$)) that provides a probabilistic indication of whether the predicted image ($I_t^*$) is real or fake. This loss measure is particularly effective at identifying and removing cloudy or patchy artifacts in the generated image $I_t^*$. Background information on the general topic of GAN networks can be found in GULRAJANI, et al. "Improved Training of Wasserstein GANs," in Advances in Neural Information Processing Systems 30 (NIPS 2017), 2017, 11 pages.

The training system 212 generates a final loss measure (L) as a weighted sum of the individual loss measures described above. That is, the training system 212 can produce the final loss measure using: $\mathcal{L} = \lambda_L \mathcal{L}_L + \lambda_I \mathcal{L}_I + \lambda_P \mathcal{L}_P + \lambda_D D(I_t^*)$. The symbols $\lambda_L$, $\lambda_I$, $\lambda_P$ and $\lambda_D$ refer to environment-specific constants, and are set, in one illustrative case, to 0.01, 1.0, 1.0, and 0.0001, respectively. The training system 212 can perform training using conventional machine-learning training techniques, such as backpropagation in combination with stochastic gradient descent (SGD).

B. Illustrative Processes

FIGS. 9-12 show illustrative processes that explain one manner of operation of the image-processing system 202 of Section A in flowchart form. Since the principles underlying the operation of the image-processing system 202 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more processors and/or other logic units that include a task-specific collection of logic gates.

FIG. 9 shows a process 902 that explains one manner of operation of the transforming component 104. In block 904, the transforming component 104 receives an input image (e.g., the input image 116) captured by a camera (e.g., the camera 114) under source conditions, the input image showing a user. In block 906, the transforming component 904 removes, using a machine-trained model (e.g., the machine-trained model 210), a visual effect from a source region of interest (e.g., the source face region 220) of the input image that is caused by the source conditions. The removing is performed by using the machine-trained model to transform the source region of interest to a target region of interest (e.g., the target face region 224) for a simulated case in which the input image is considered to have been captured under target conditions that are different than the source conditions. The source conditions including first screen illumination that is actually presented by an electronic screen (e.g., the electronic screen) with which the user is interacting, and the target conditions including second screen illumination that is presented by the electronic screen for the simulated case, the second screen illumination being different than the first screen illumination. In block 908, the transforming component 104 produces an output image (e.g., the output image 122) based on the target region of interest.

FIG. 10 shows a process 1002 that explains another manner of operation of the transforming component 104. In block 1004, the transforming component 104 receives an input image (e.g., the input image 116) that includes a face region (e.g., the face region 220) that represents a face of a user who is interacting with display information presented on an electronic screen (e.g., the electronic screen 108). In block 1006, the transforming component 104 removes a visual effect from the face region of the input image that is caused, at least in part, by the screen illumination provided by the electronic screen, to provide a processed image (e.g., the target face region 224). In block 1008, the transforming component 104 produces an output image (e.g., the output image 122) based on the processed image. The transforming component 104 performs the removing operation by using a machine-trained model (e.g., the machine-trained model 210) to generate the processed image based on the input image, independent of an input signal that describes the screen illumination presented by the electronic screen. In some implementations, the screen illumination is caused by the display information presented by the electronic screen and/or other characteristics of the electronic screen.

Figure 11:
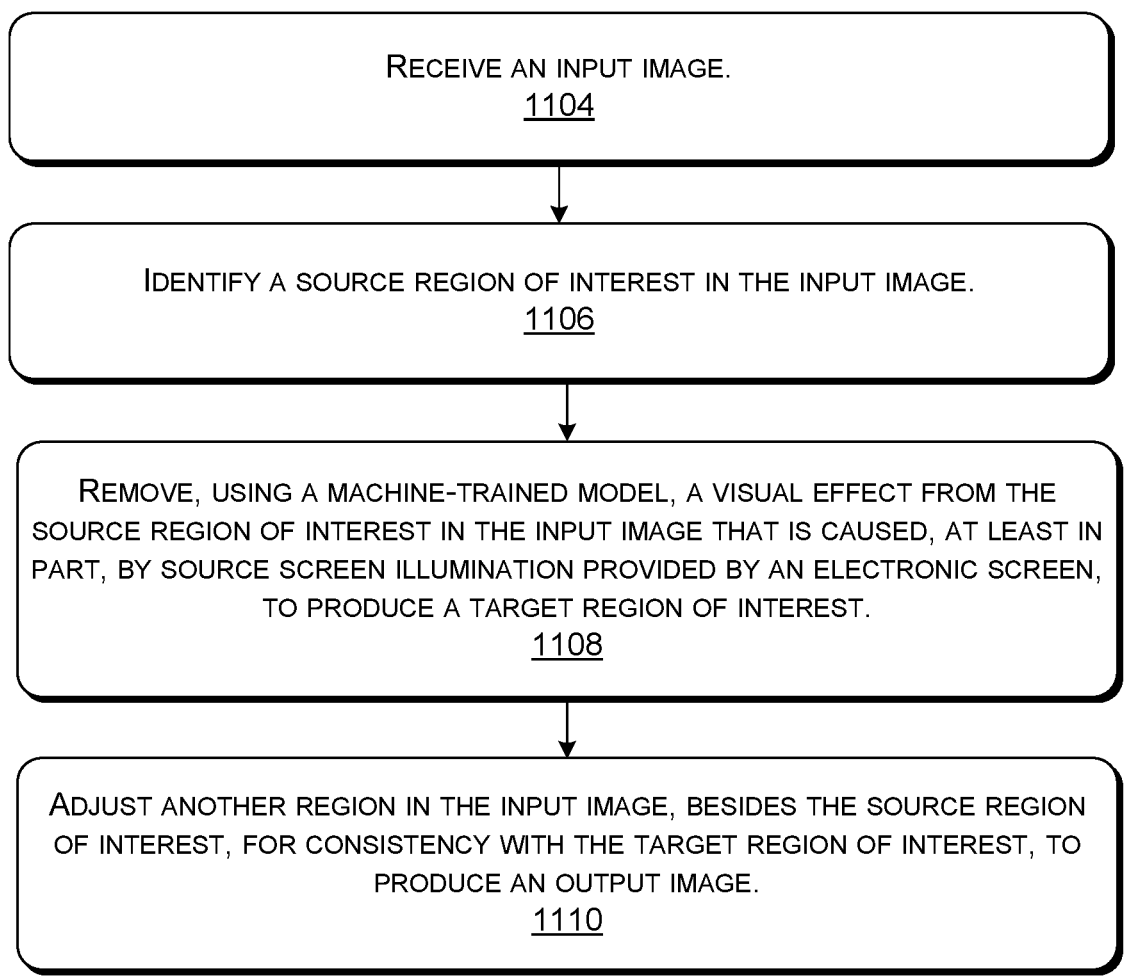
FIG. 11 shows a process that explains still another manner of operation of the effect-removing component of FIG. 2.

FIG. 11 shows a process 1102 that describes another manner of operation of the transforming component 104. In block 1104, the transforming component 104 receives an input image (e.g., the input image 116). In block 1106, the transforming component 104 identifies a source region of interest in the input image. In block 1108, the transforming component 104 removes, using a machine-trained model 210, a visual effect from the source region of interest in the input image that is caused, at least in part, by the screen illumination provided by an electronic screen (e.g., the electronic screen 108), to produce a target region of interest (e.g., the target face region 224). In block 1110, the transforming component 104 adjusts another region in the input image, besides the source region of interest, for consistency with the target region of interest, to produce an output image (e.g., the output image 122).

FIG. 12 shows a process 1202 that explains one manner of operation of the example-mining system (e.g., the example-mining system 216) and the training system (e.g., the training system 212). In block 1204, the example-mining system generates an example image (e.g., the example image 614) that shows a virtual environment (e.g., the virtual environment 702), the virtual environment including a simulated user face illuminated by plural sources of simulated illumination, one of the sources being a simulated electronic screen (e.g., the simulated electronic screen 708). In block 1206, the example-mining system produces a particular training example (e.g., the training example 612) that includes the example image, a description (e.g., the description 616) of simulated display information presented by the simulated electronic screen 708, and a ground-truth image (e.g., the ground-truth image 618) that shows the simulated user face free of artifacts caused by simulated light projected by the simulated electronic screen. In block 1208, the training system trains a machine-trained model (e.g., the machine-trained model 210) based on a set of training examples that includes the particular training example 612, other training examples in the set besides the particular training example being created in a same way as the training example described above.

C. Representative Computing Functionality

FIG. 13 shows an example of computing equipment that, in some implementations, is used to implement any of the components of the image-processing system 202. The computing equipment includes a set of user computing devices 1302 coupled to a set of servers 1304 via a computer network 1306. In some implementations, each user computing device corresponds to any device that performs a computing function, including a desktop computing device, a laptop computing device, a handheld computing device of any type (e.g., a smartphone, or a tablet-type computing device), a mixed reality device, a wearable computing device, an Internet-of-Things (IoT) device, a gaming system, etc. In some implementations, the computer network 1306 is implemented as a local area network, a wide area network (e.g., the Internet), one or more point-to-point links, or any combination thereof.

FIG. 13 also indicates that the functionality of the image-processing system 202 can be spread across the user computing devices 1302 and/or the servers 1304 in any manner. For instance, in some cases, the transforming component 104 is entirely implemented by each user computing device with which a user interacts. In other cases, one or more of the servers 1304 implement the transforming component 104. In some implementations, each user interacts with the servers 1304 via a browser application or other programmatic interfaces provided by a user computing device. In other case, the functionality associated with the transforming component 104 is distributed between the servers 1304 and each user computing device in any manner. The example-mining system 216 and the training system 212 can be implemented by any resource(s) of the computing equipment shown in FIG. 13 in a similar manner.

Figure 14:
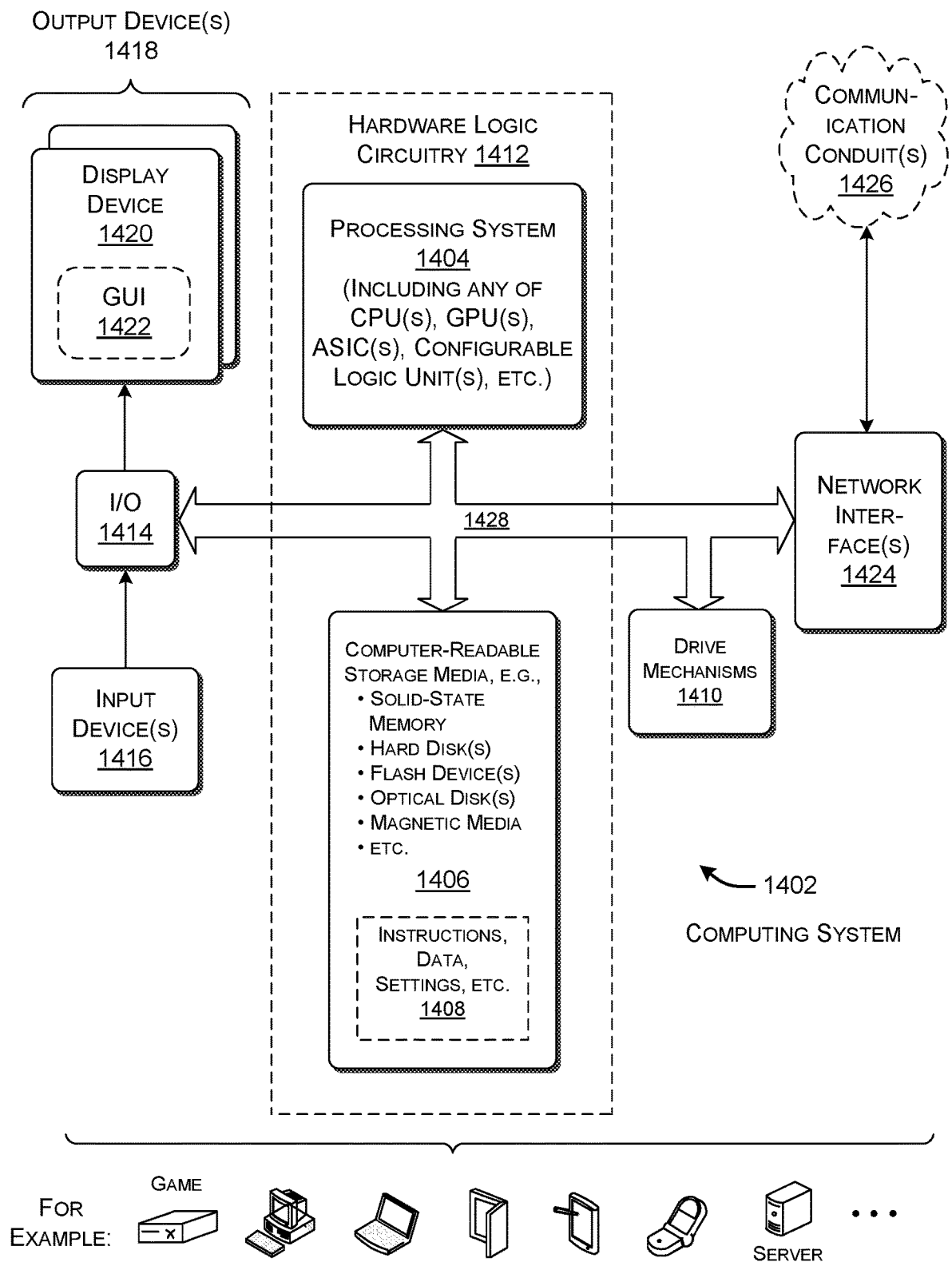
FIG. 14 shows an illustrative type of computing system that, in some implementations, is used to implement any aspect of the features shown in the foregoing drawings.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any user computing device or any server shown in FIG. 11. In all cases, the computing system 1402 represents a physical and tangible processing mechanism.

The computing system 1402 includes a processing system 1404 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, and/or data. For example, in some implementations, the computer-readable storage media 1406 includes one or more solid-state devices, one or more magnetic hard disks, one or more optical disks, magnetic tape, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1402 utilizes any instance of the computer-readable storage media 1406 in different ways. For example, in some implementations, any instance of the computer-readable storage media 1406 represents a hardware memory unit (such as Random Access Memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described in Section B. FIG. 14 generally indicates that hardware logic circuitry 1412 includes any combination of the processing system 1404 and the computer-readable storage media 1406.

Alternatively, or in addition, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. Alternatively, or in addition, the processing system 1404 includes a collection of programmable hardware logic gates that are set to perform different application-specific tasks. The latter category of devices includes, for example, Programmable Array Logic Devices (PALs), Generic Array Logic Devices (GALs), Complex Programmable Logic Devices (CPLDs), Field-Programmable Gate Arrays (FPGAs), etc. In these implementations, the processing system 1404 can also be said to incorporate a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 can be implemented in any manner, e.g., by a local area computer network, a wide area computer network (e.g., the Internet), point-to-point connections, or any combination thereof. The communication conduit(s) 1426 can include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 1. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to a first aspect, some implementations of the technology described herein include a computer-implemented method (e.g., the process 1002) for processing image information. The method includes: receiving (e.g., in block 1004) an input image (e.g., the input image 116) that includes a face region (e.g., the source face region 220) that represents a face of a user who is interacting with display information presented on an electronic screen (e.g., the electronic screen 108); removing (e.g., in block 1006) a visual effect from the face region of the input image that is caused, at least in part, by screen illumination provided by the electronic screen, to provide a processed image (e.g., the target face region 224); and producing (e.g., in block 1008) an output image (e.g., the output image 122) based on the processed image. The removing operation uses a machine-trained model (e.g., the machine-trained model 210) to generate the processed image based on the input image, independent of an input signal that describes the screen illumination presented by the electronic screen.

(A2) According to some implementations of the method of A1, the removing also removes a visual effect from a region of the input image other than the face region.

(A3) According to some implementations of any of the methods of A1 or A2, the screen illumination is caused by content that is presented by the electronic screen and/or a characteristic of the electronic screen, other than the content that the electronic screen presents.

(A4) According to some implementations of any of the methods of A1-A3, the removing also removes another visual effect caused by a source that affects the input image other than the electronic screen.

(A5) According to some implementations of any of the methods of A1-A4, the input image includes a frame of input video having plural frames, the method is performed for the plural frames, and the output image is a frame of output video having plural frames.

(A6) According to some implementations of any of the methods of A1-A5, the replacing is performed by a computing device with which the user is interacting, and wherein the method further includes sending the output image to a participant of a videoconferencing session in which the user is taking part.

(A7) According to some implementations of any of the methods of A1-A6, the method further includes identifying the face region in the input image. The face region in the input image is a source face region, and wherein the screen illumination that is provided by the electronic screen is source screen illumination. Further, the removing is performed by using the machine-trained model to transform the source face region to a target face region for a simulated case in which the electronic screen is considered to have provided target screen illumination, the target face region being the processed image, and the target screen illumination being different than the source screen illumination that the electronic screen actually provides.

(A8) According to some implementations of the method of A7, the target screen illumination is caused, at least in part, by presentation of a block of display information having a single color.

(A9) According to some implementations of any of the methods of A1-A8, the method further includes identifying the face region of the input image, the face region being a source face region. The removing involves transforming the source face region to a target face region, the target face region being the processed image. The producing generates the output image by adjusting another region in the input image, besides the source face region, for consistency with the target face region.

(A10) According to some implementations of the method of claim A10, the adjusting includes generating parameter information that is a function of the source face region and the target face region, and modifying the other region based on the parameter information.

(A11) According to some implementations of any of the methods of A1-A10, the method further includes training the machine-trained model by: generating an example image from a vantage point of a simulated camera in a virtual environment, the virtual environment including a simulated user face illuminated by plural sources of simulated illumination, one of the sources being a simulated electronic screen; producing a particular training example that includes the example image, a description of simulated screen illumination provided by the simulated electronic screen, and a ground-truth image that shows the simulated user face free of an effect caused by the simulated screen illumination provided by the simulated electronic screen; and training the machine-trained model based on a set of training examples that includes the particular training example, other training examples in the set besides the particular training example being created in a same way as the target training example.

(A12) According to some implementations of the method of A11, the generating includes: producing plural component images for different respective simulated light sources; combining the plural component images to produce a combined image; and generating the example image based on the combined image.

(A13) According to some implementations of any of the methods of A11 or A12, the generating includes: producing an initial image based that uses a first color standard; and converting the initial image to the example image in a second color standard that is different than the first color standard.

(B1) According to a second aspect, some implementations of the technology described herein include a computer-implemented method (e.g., the process 902) for processing image information. The method includes: receiving (e.g., in block 904) an input image (e.g., the input image 116) captured by a camera (e.g., the camera 114) under source conditions, the input image showing a user; removing (e.g., in block 906), using a machine-trained model (e.g., the machine-trained model 210), a visual effect from a source region of interest (e.g., the source face region 220) of the input image that is caused by the source conditions, the removing being performed by using the machine-trained model to transform the source region of interest to a target region of interest (e.g., the target face region 224) for a simulated case in which the input image is considered to have been captured under target conditions that are different than the source conditions; and producing (e.g., in block 908) an output image (e.g., the output image 122) based on the target region of interest. The source conditions include first screen illumination that is actually presented by an electronic screen (e.g., the electronic screen 108) with which the user is interacting, and the target conditions including second screen illumination that is presented by the electronic screen for the simulated case, the second screen illumination being different than the first screen illumination.

(C1) According to a third aspect, some implementations of the technology described herein include a computer-implemented method (e.g., the process 1102) for processing image information. The method includes: receiving (e.g., in block 1104) an input image (e.g., the input image 116); identifying (e.g., in block 1106) a source region of interest in the input image; removing (e.g., in block 1108), using a machine-trained model (e.g., the machine-trained model 210), a visual effect from the source region of interest in the input image that is caused, at least in part, by source screen illumination provided by an electronic screen (e.g., the electronic screen 108), to produce a target region of interest (e.g., the target face region 224); and adjusting (e.g., in block 1110) another region (e.g., the torso region 222) in the input image, besides the source region of interest, for consistency with the target region of interest, to produce an output image (e.g., the output image 122).

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., information 1408) that, when executed by the processing system, perform any of the methods described herein (e.g., any of the methods of A1-A13, B1, or C1).

In yet another aspect, some implementations of the technology described herein include a computer-readable storage medium (e.g., the computer-readable storage medium 1406) for storing computer-readable instructions (e.g., the information 1408). A processing system (e.g., the processing system 1404) executes the computer-readable instructions to perform any of the operations described herein (e.g., the operation in any of the methods of A1-A13, B1, or C1).

More generally stated, any of the individual elements and steps described herein can be combined, for example, into any logically consistent permutation or subset. Further, any such combination can be manifested, for example, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1412 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, while the description may explain certain features as alternative ways of carrying out identified functions or implementing identified mechanisms, the features can also be combined together in any combination. Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" can include zero members, one member, or more than one member. Finally, the terms "exemplary" or "illustrative" refer to one implementation among potentially many implementations.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing image information, comprising:
    receiving an input image that includes a face region that represents a face of a user who is interacting with display information presented on an electronic screen;
    removing a visual effect from the face region of the input image that is caused, at least in part, by screen illumination provided by the electronic screen, to provide a processed image; and
    producing an output image based on the processed image, the removing using a machine-trained model to generate the processed image based on the input image, independent of an input signal that describes the screen illumination presented by the electronic screen,
    the machine-trained model having been trained by:
    generating an example image from a vantage point of a simulated camera in a virtual environment, the virtual environment including a simulated user face illuminated by plural sources of simulated illumination, one of the sources being a simulated electronic screen;
    producing a particular training example that includes the example image, a description of simulated screen illumination provided by the simulated electronic screen, and a ground-truth image that shows the simulated user face free of an effect caused by the simulated screen illumination provided by the simulated electronic screen; and
    training the machine-trained model based on a set of training examples that includes the particular training example, other training examples in the set besides the particular training example being created in a same way as the particular training example.

2. The computer-implemented method of claim 1, wherein the removing also removes a visual effect from a region of the input image other than the face region.

3. The computer-implemented method of claim 1, wherein the screen illumination is caused by content that is presented by the electronic screen and/or a characteristic of the electronic screen, other than the content that the electronic screen presents.

4. The computer-implemented method of claim 1, wherein the removing also removes another visual effect caused by a source that affects the input image other than the electronic screen.

5. The computer-implemented method of claim 1,
    wherein the input image includes a frame of input video having plural frames,
    wherein the method is performed for the plural frames, and
    wherein the output image is a frame of output video having plural frames.

6. The computer-implemented method of claim 1, wherein the replacing is performed by a computing device with which the user is interacting, and wherein the method further includes sending the output image to a participant of a videoconferencing session in which the user is taking part.

7. The computer-implemented method of claim 1,
    wherein the method further includes identifying the face region in the input image,
    wherein the face region in the input image is a source face region, and wherein the screen illumination that is provided by the electronic screen is source screen illumination, and
    wherein the removing is performed by using the machine-trained model to transform the source face region to a target face region for a simulated case in which the electronic screen is considered to have provided target screen illumination, the target face region being the processed image, and the target screen illumination being different than the source screen illumination that the electronic screen actually provides.

8. The computer-implemented method of claim 7, wherein the target screen illumination is caused, at least in part, by presentation of a block of display information having a single color.

9. The computer-implemented method of claim 1,
    wherein the method further includes identifying the face region of the input image, the face region being a source face region,
    wherein the removing involves transforming the source face region to a target face region, the target face region being the processed image, and
    wherein the producing generates the output image by adjusting another region in the input image, besides the source face region, for consistency with the target face region.

10. The computer-implemented method of claim 9, wherein the adjusting includes generating parameter information that is a function of the source face region and the target face region, and modifying the other region based on the parameter information.

11. The computer-implemented method of claim 1, wherein the generating includes:
    producing plural component images for different respective simulated light sources;
    combining the plural component images to produce a combined image; and
    generating the example image based on the combined image.

12. The computer-implemented method of claim 11, wherein the generating includes:
    producing an initial image that uses a first color standard; and
    converting the initial image to the example image in a second color standard that is different than the first color standard.

13. A computing system for processing image information, comprising:
- a processing system comprising a processor; and
- a storage device for storing machine-readable instructions that, when executed by the processing system, perform operations comprising:
- receiving an input image captured by a camera under source conditions, the input image showing a user;
- removing, using a machine-trained model, a visual effect from a source region of interest of the input image that is caused by the source conditions,
- the removing being performed by using the machine-trained model to transform the source region of interest to a target region of interest for a simulated case in which the input image is considered to have been captured under target conditions that are different than the source conditions,
- the source conditions including first screen illumination that is actually presented by an electronic screen with which the user is interacting, and the target conditions including second screen illumination that is presented by the electronic screen for the simulated case, the second screen illumination being different than the first screen illumination; and
- producing an output image based on the target region of interest,
- the machine-trained model having been trained by:
- producing different simulated user faces and different simulated instances of screen illumination;
- producing example images based on the simulated user faces and simulated instances of screen illumination, a particular example image being based on one of the simulated user faces that is illuminated by one of the simulated instances of screen illumination;
- producing plural training examples based on the example images; and
- training the machine-trained model based on the plural training examples.

14. The computing system of claim 13, wherein the replacing is performed by a computing device with which the user is interacting, and wherein the method further includes sending the output image to a participant of a videoconferencing session in which the user is taking part.

15. The computing system of claim 13, wherein the source region of interest is a source face region, and wherein the target region of interest is a target face region produced by the transforming.

16. The computing system of claim 13, wherein each of the plural instances of simulated screen information includes one or more blocks having respective colors.

17. A computer-readable storage medium for storing computer-readable instructions, wherein a processing system executing the computer-readable instructions performs operations comprising:
- receiving an input image;
- identifying a source face region in the input image;
- removing, using a machine-trained model, a visual effect from the source face region in the input image that is caused, at least in part, by source screen illumination provided by an electronic screen, to produce a target face region;
- generating parameter information that is a function of pixels in the source face region and counterpart pixels in the target face region; and
- adjusting another region in the input image, besides the source face region, for consistency with the target region of interest, to produce an output image, the adjusting including adjusting the pixel values in said another region by the parameter information.

18. The computer-readable storage medium of claim 17, wherein the removing is performed by using the machine-trained model to transform the source face region to the target face region for a simulated case in which the electronic screen is considered to have presented target screen illumination, the target screen illumination being different than the source screen illumination that the electronic screen actually presented.

19. The computer-readable storage medium of claim 17, wherein the other region is another body part of the user besides a head of the user.

20. The computer-readable storage medium of claim 17, wherein the generating parameter information includes dividing pixel values in the source face region by corresponding pixel values in the target face region.

* * * * *